US011483988B2

(12) United States Patent
Bertram et al.

(10) Patent No.: US 11,483,988 B2
(45) Date of Patent: Nov. 1, 2022

(54) VERTICAL FARMING SYSTEMS AND METHODS

(71) Applicant: OnePointOne, Inc., Gilroy, CA (US)

(72) Inventors: Samuel Bernard Clifford Bertram, Gilroy, CA (US); John Russell Bertram, Gilroy, CA (US); Sara Sadae Kuwahara, Sunnyvale, CA (US); Robert Thomas McDonald, Santa Clara, CA (US); Travis Alexander Woodrow, Menlo Park, CA (US); Scot Andrew Tomer, Monte Serono, CA (US); Paul David Mahacek, Hawthorne, CA (US); Zach Daniel Bellay, San Jose, CA (US); Daniel James Buckley, Oakland, CA (US); Robert John Drazovich, Palo Alto, CA (US); Ian Scott Knight, San Mateo, CA (US); Sebastian Alexander Schwartz, East Lindfield (AU); Anthony Yu, Lincoln, CA (US)

(73) Assignee: OnePointOne, Inc., Gilroy, CA (US)

( * ) Notice: Subject to any disclaimer, the term of this patent is extended or adjusted under 35 U.S.C. 154(b) by 222 days.

(21) Appl. No.: 16/206,681

(22) Filed: Nov. 30, 2018

(65) Prior Publication Data

US 2019/0159415 A1  May 30, 2019

Related U.S. Application Data

(60) Provisional application No. 62/592,865, filed on Nov. 30, 2017.

(51) Int. Cl.
*A01G 31/06* (2006.01)
*A01G 7/04* (2006.01)
(Continued)

(52) U.S. Cl.
CPC ............. *A01G 31/06* (2013.01); *A01G 7/045* (2013.01); *A01G 9/022* (2013.01); *A01G 9/18* (2013.01);
(Continued)

(58) Field of Classification Search
CPC ........ A01G 9/18; A01G 27/003; A01G 9/249; A01G 31/06; A01G 7/045; A01G 9/26
See application file for complete search history.

(56) References Cited

U.S. PATENT DOCUMENTS

| 4,028,847 A | | 6/1977 | Davis et al. | |
| 5,016,541 A | * | 5/1991 | Feaster, Jr. ............. | A01G 9/143 104/129 |

(Continued)

FOREIGN PATENT DOCUMENTS

| CN | 104542227 | 4/2015 |
| CN | 107493951 | 12/2017 |

(Continued)

OTHER PUBLICATIONS

International Search Report in PCT/US2018/063424 date Feb. 5, 2019.

(Continued)

*Primary Examiner* — Peter M Poon
*Assistant Examiner* — Shada Mohamed Alghailani
(74) *Attorney, Agent, or Firm* — DLA Piper LLP US

(57) ABSTRACT

An automatic vertical farming system may include a frame defining at least one growth area and configured to support a plurality of vertical plant growth structures within the at least one growth area. The system may include at least one light, at least one liquid conduit, and at least one gas conduit. The system may include at least one robot disposed on a top side of the frame and movably supported by the frame. The at least one robot may include at least one tool configured to (Continued)

manipulate the plurality of vertical plant growth structures. The system may include a control system including at least one processor configured to automatically control illumination by the at least one light, liquid flow through the at least one liquid conduit, gas flow through the at least one gas conduit, and operation of the at least one robot.

26 Claims, 27 Drawing Sheets

(51) Int. Cl.
    *A01G 9/02*         (2018.01)
    *A01G 9/18*         (2006.01)
    *A01G 27/00*       (2006.01)
    *A01G 9/26*         (2006.01)
    *A01G 24/30*       (2018.01)
    *A01G 9/20*         (2006.01)

(52) U.S. Cl.
    CPC ............... *A01G 9/20* (2013.01); *A01G 9/26* (2013.01); *A01G 24/30* (2018.02); *A01G 27/003* (2013.01); *A01G 27/008* (2013.01)

(56) References Cited

U.S. PATENT DOCUMENTS

| | | | |
|---|---|---|---|
| 5,946,896 A * | 9/1999 | Daniels | A01D 46/264 56/328.1 |
| 6,243,987 B1 | 6/2001 | Hessel | |
| 8,533,993 B2 | 9/2013 | Pettibone | |
| 8,613,158 B2 | 12/2013 | Conrad | |
| 8,782,948 B2 | 7/2014 | Harwood et al. | |
| 9,345,201 B2 | 5/2016 | Sakura et al. | |
| 9,516,822 B2 | 12/2016 | Gonyer et al. | |
| 10,973,185 B2 * | 4/2021 | Creechley | A01G 7/045 |
| 2004/0163308 A1 * | 8/2004 | Uchiyama | A01G 31/042 47/1.01 R |
| 2009/0307973 A1 * | 12/2009 | Adams | A01G 31/06 47/62 C |
| 2011/0120002 A1 * | 5/2011 | Pettibone | A01G 31/042 47/65 |
| 2011/0131876 A1 | 6/2011 | Pettibone | |
| 2012/0054061 A1 | 3/2012 | Fok et al. | |
| 2012/0060416 A1 | 3/2012 | Brusatore | |
| 2014/0020292 A1 * | 1/2014 | McNamara | A01G 9/24 47/66.6 |
| 2014/0137471 A1 | 5/2014 | Harwood et al. | |
| 2014/0283452 A1 | 9/2014 | Dittman | |
| 2014/0340100 A1 | 11/2014 | Popa et al. | |
| 2014/0344099 A1 | 11/2014 | Fok et al. | |
| 2014/0366443 A1 | 12/2014 | Brusatore | |
| 2015/0000190 A1 | 1/2015 | Gibbons | |
| 2015/0027048 A1 | 1/2015 | Fok et al. | |
| 2015/0027356 A1 | 1/2015 | Fok et al. | |
| 2015/0196002 A1 | 7/2015 | Friesth | |
| 2015/0282433 A1 * | 10/2015 | Legerton | A01G 9/033 47/65.9 |
| 2015/0347544 A1 * | 12/2015 | Caraballoso | G06Q 10/10 707/723 |
| 2016/0029582 A1 | 2/2016 | Anderson et al. | |
| 2016/0129587 A1 * | 5/2016 | Lindbo | B65D 21/0209 700/218 |
| 2016/0192594 A1 | 7/2016 | Mawendra | |
| 2016/0205872 A1 * | 7/2016 | Chan | G05D 1/0094 |
| 2016/0235025 A1 | 8/2016 | Bray | |
| 2016/0295820 A1 | 10/2016 | Aykroyd et al. | |
| 2016/0345518 A1 * | 12/2016 | Collier | A01G 9/023 |
| 2017/0013810 A1 * | 1/2017 | Grabell | A01K 63/00 |
| 2017/0027110 A1 | 2/2017 | Ito et al. | |
| 2017/0099791 A1 | 4/2017 | Joseph et al. | |
| 2018/0007845 A1 | 1/2018 | Martin | |
| 2018/0014486 A1 * | 1/2018 | Creechley | A01G 31/06 |
| 2018/0035625 A1 | 2/2018 | Lindbo et al. | |
| 2018/0037411 A1 * | 2/2018 | Lindbo | B65G 1/0464 |
| 2018/0042192 A1 * | 2/2018 | Volpe | A01G 31/02 |
| 2018/0054977 A1 * | 3/2018 | Fok | A01G 9/143 |
| 2018/0054985 A1 * | 3/2018 | Li | A01G 7/045 |
| 2018/0064048 A1 | 3/2018 | Joseph et al. | |
| 2018/0146618 A1 * | 5/2018 | Elazary | G05D 1/0246 |
| 2018/0203458 A1 * | 7/2018 | Zhang | G05D 1/0255 |
| 2018/0220591 A1 | 8/2018 | Anderson et al. | |
| 2018/0235156 A1 | 8/2018 | Blair et al. | |
| 2018/0295800 A1 * | 10/2018 | Kiernan | A01G 31/06 |
| 2018/0343810 A1 * | 12/2018 | Counne | A01G 7/045 |
| 2019/0082619 A1 | 3/2019 | Martin | |
| 2019/0133062 A1 | 5/2019 | Joseph | |
| 2019/0133063 A1 * | 5/2019 | Bateman | A01G 31/06 |
| 2019/0133064 A1 * | 5/2019 | Fyvolent | A01G 7/045 |
| 2019/0159415 A1 | 5/2019 | Bertram | |
| 2019/0223395 A1 * | 7/2019 | Warrick | A01G 9/027 |
| 2019/0230876 A1 * | 8/2019 | Lysaa | A01G 31/042 |
| 2019/0230878 A1 * | 8/2019 | Albert | A01G 31/06 |
| 2019/0246571 A1 | 8/2019 | Ingram-Tedd et al. | |
| 2019/0281778 A1 * | 9/2019 | Hawley-Weld | A01G 9/0295 |
| 2019/0320591 A1 * | 10/2019 | Anderson | A01G 31/06 |
| 2019/0335692 A1 * | 11/2019 | Speetjens | F03B 13/00 |
| 2019/0380283 A1 * | 12/2019 | Chong | G05B 19/042 |
| 2020/0015430 A1 * | 1/2020 | Hawley-Weld | A01G 9/047 |
| 2020/0037524 A1 * | 2/2020 | Friedman | A01G 9/0295 |
| 2020/0060103 A1 * | 2/2020 | Klase | A01G 9/143 |
| 2020/0154660 A1 * | 5/2020 | Cuello | A01G 9/02 |
| 2020/0214228 A1 * | 7/2020 | Cho | A01G 9/26 |
| 2020/0229357 A1 * | 7/2020 | Spiro | A01G 9/029 |
| 2020/0236883 A1 * | 7/2020 | Ambrosi | A01G 31/06 |
| 2020/0260673 A1 * | 8/2020 | Travaglini | A01G 31/06 |
| 2020/0281129 A1 * | 9/2020 | Anderson | A01G 9/0297 |
| 2020/0383277 A1 * | 12/2020 | Tyink | A01G 9/023 |

FOREIGN PATENT DOCUMENTS

| | | | |
|---|---|---|---|
| CN | 208807177 | 5/2019 | |
| CN | 109952837 | 7/2019 | |
| GB | 2541765 | 3/2019 | |
| KR | 20160101456 | 8/2016 | |
| KR | 10-1987920 | 6/2019 | |
| WO | WO-03095339 A1 * | 11/2003 | ........... B65G 1/0407 |
| WO | WO-2012132646 A1 * | 10/2012 | ............ A01G 27/00 |
| WO | WO 2016/019330 | 2/2016 | |
| WO | WO 2016/164652 | 10/2016 | |
| WO | WO 2017/024353 | 2/2017 | |
| WO | WO 2017/062918 | 4/2017 | |
| WO | WO 2017/101691 | 6/2017 | |
| WO | WO 2017/134473 | 8/2017 | |

OTHER PUBLICATIONS

Written Opinion in PCT/US2018/063424 dated Feb. 5, 2019.
"All About Fodder Growing Technology" http://foddermachine.com/HydroponicFodderGrowingSystem.pdf (Accessed Dec. 21, 2017).
"Cornell Controlled Environment Agriculture" http://www.cornellcea.com/attachments/Cornell%20CEA%20baby%20spinach%20handboo k.pdf (Accessed Dec. 21, 2017).
"The Vertical Aeroponic Growing System" http://synergyii.com/aeroponic/VAP.pdf (Accessed Dec. 21, 2017).
Graham Seederman, "GS3 Automatic", Seederman Products, pp. 1-8, Jul. 6, 2020 http://seederman.com/.
Imran Ali Lakhiar et al., "Overview of the aeroponic agriculture—An emerging technology for global food security", ResearchGate—Article in International Journal of Agriculture and Biological Engineering, pp. 1-11, Jan. 2020, https://www.researchgate.net/publication/339643183.
"Aeroponics", DIY Guide, pp. 1-126, Jul. 5, 2020 https://sites.google.com/site/growboxguy/aeroponics.
Carmelo Maucieri et al., "Hydroponic Technologies", The Authors 2019; pp. 77-110, 2019 https://doi.org/10.1007/978-3-030-15943-6_4.
Nathan Hurst, "This Robotic Farming Sysytem Could Be the Answer to Labor Shortages", Smithsonian Magazine, pp. 1-4, Oct.

(56) References Cited

OTHER PUBLICATIONS 18, 2018 https://www.smithsonianmagazine.com/innovation/robotic-farming-system-could-be-answer-labor-shortages-180970575/.
Francisco Yandun et al., "A Survey of Ranging and Imaging Techniques for Precision Agriculture Phenotyping", IEEE/ASME Transactions on Mechatronics, pp. 1-11, Jul. 5, 2020.
Benjamin Franchetti et al., "Vision Based Modeling of Plants Pheotyping in Verticle Farming under Artificial Lighting", Sensors, pp. 1-21, 2019 www.mdpi.com/journal/sensors.
Y. Gleba et al.; "Magnification—a new platform for expressing recombinant vaccines in plants", Science Direct, pp. 2042-2048, Jan. 13, 2005, www.elsevier.com/locate/vaccine.
International Search Report dated Dec. 29, 2021 issued in International Application No. PCT/US2021/051534.
Written Opinion dated Dec. 29, 2021 issued in International Application No. PCT/US2021/051534.
Image File Wrapper History of U.S. Appl. No. 17/481,852, filed Sep. 22, 2021.
U.S. Appl. No. 17/481,852, filed Sep. 22, 2021, Pending.
Extended European Search Report in Application No. 18884763.6 dated Jul. 27, 2021.
Search Report in Application No. 18884763.6 dated Aug. 8, 2021.

\* cited by examiner

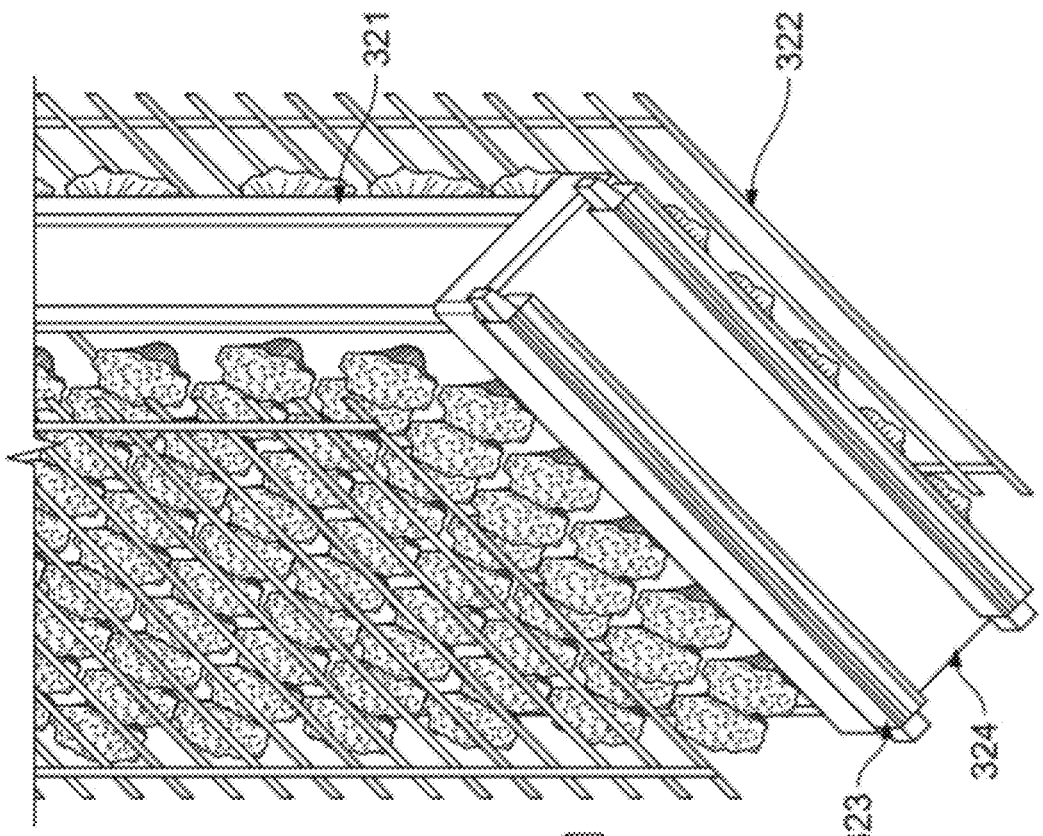
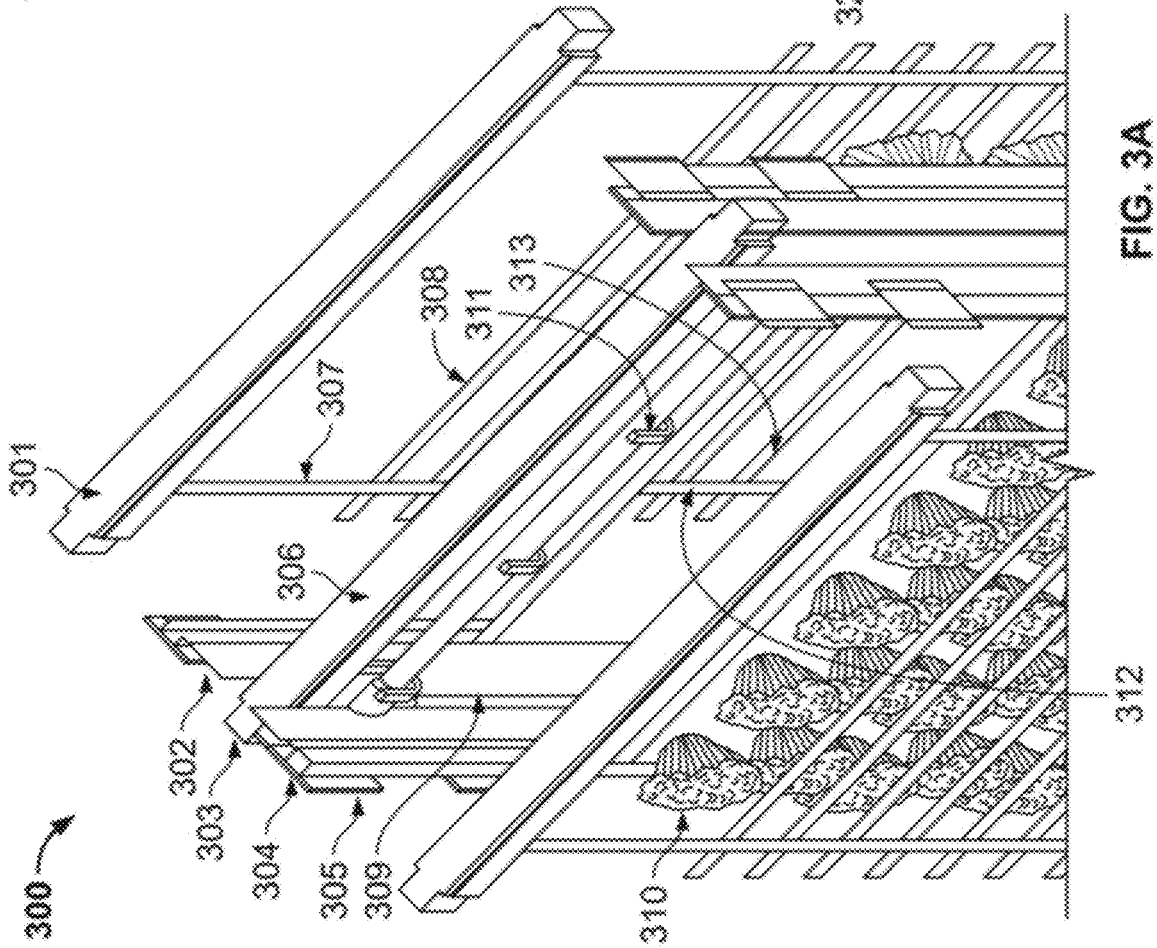
FIG. 3B
FIG. 3A

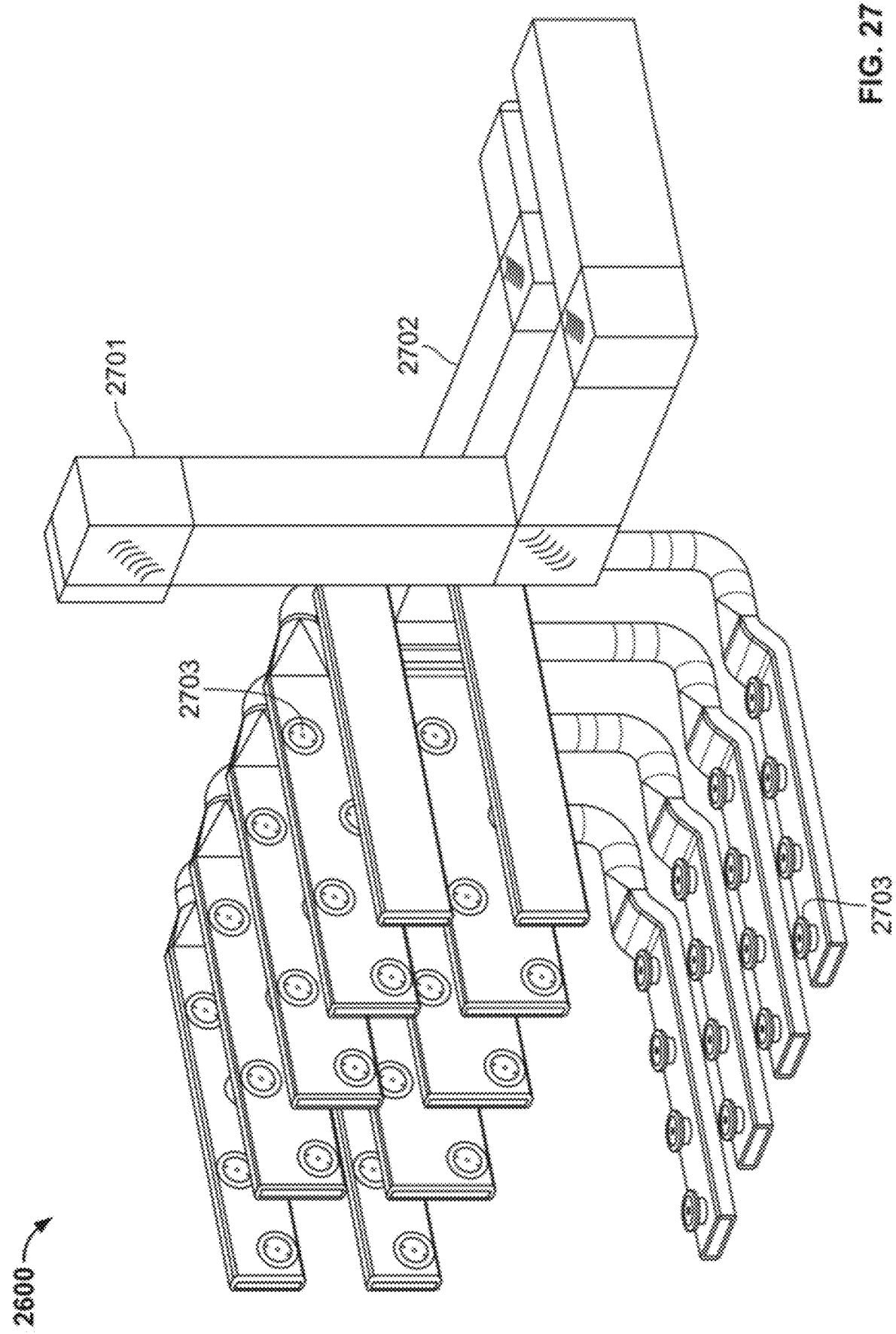

VERTICAL FARMING SYSTEMS AND METHODS

CROSS-REFERENCE TO RELATED APPLICATIONS

This application claims priority from U.S. Provisional Application No. 62/592,865, entitled "A Fully Automated Aeroponic Indoor Farming System, From Germination Through Harvest," filed on Nov. 30, 2017, the entirety of which is incorporated by reference herein.

BRIEF DESCRIPTIONS OF THE DRAWINGS

FIG. 3A shows a cavity according to an embodiment of the disclosure.

FIG. 3B shows a cavity fluidics system according to an embodiment of the disclosure.

FIG. 27 shows an HVAC system with no growth structure according to an embodiment of the disclosure.

DETAILED DESCRIPTIONS OF SEVERAL EMBODIMENTS

Figure 1:
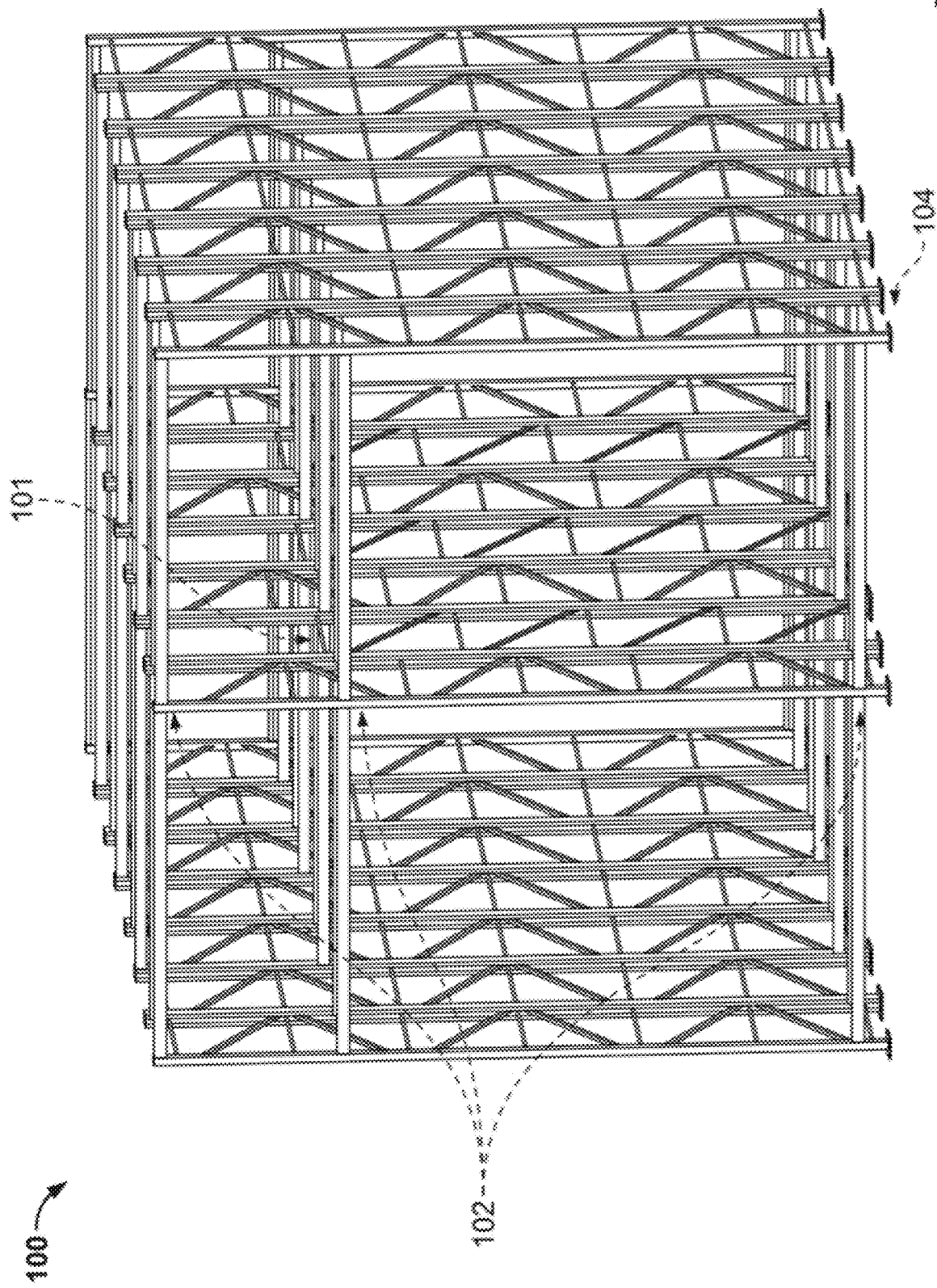
FIG. 1 shows a growth structure according to an embodiment of the disclosure.

Disclosed systems and methods may enable fully automated indoor farming on a vertical plane. For example, some embodiments may automate the process of vertical farming from the moment the seed arrives to the farming facility to the time the product exits the facility. Some embodiments may include mobile, multi-robot systems operating above a growth structure to automate the growth, operation, repair, and construction of indoor farming facilities. Some embodiments may combine automated robots, growth structures, growth modules, and/or software that may optimize indoor farming processes.

In some embodiments, system hardware and/or software may automate the growth of one or more plants through applying and varying lighting, nutrients, and/or atmospheric compositions correspondent to the crop's genetics and/or stage of maturity, among other things. Robot systems atop a growth structure may be responsible for, among many other things, the movement of plants (individually or as a group), the acquisition of sensor data, the movement of lights and fluidics systems, and/or cleaning and maintenance subroutines that may be employed to operate an indoor farming facility without the interjection of human beings throughout the decision-making and execution process.

Some embodiments may completely automate the process of cultivating biological entities end-to-end, through seeding, germination, propagation, respacing, pollination, growth, harvest, cleaning, trimming, thinning, recycling, packaging, and/or storage, for example. Some embodiments may employ one or more combinations of, among other things, automated logistics, manufacturing, machine learning, artificial intelligence, mobile multi-robotics, and/or process-optimization technologies that may not require human input for operation, maintenance, repair, improvement, and/or optimization of the system. Disclosed embodiments may accumulate information/knowledge pertaining to environmental characteristics and/or plant characteristics in order to produce biological entities with optimal plant characteristics. Implementing a vertical-plane growing system may allow for increased packing efficiencies, improved airflow due to natural convection, and/or more space efficient and/or energy efficient automation. Employing automation mechanisms may decrease operational cost and/or may decrease the pest and/or disease load experienced by the plants.

Embodiments may be configured to provide a variety of environmental characteristics. Environmental characteristics may describe, in a non-limiting manner, one or more of the following attributes (some of which are described in greater detail below): the electrical conductivity (EC) of the nutrient solution; the gaseous and aqueous temperature; the airflow speed and direction in the root zone, foliar zone, enclosed environment, and/or external environment; air pressure; the gaseous and/or aqueous $CO_2$ concentration; the gaseous and/or aqueous $O_2$ concentration; the nutrient concentrations within the nutrient solution; the water and nutrient flow; the pH of the nutrient solution; the oxidation reduction potential (ORP); the quality and intensity of light within the growth arenas; the humidity of the root and foliar zones; the cleanliness of the air; the general state of the plants; the pest and disease state of the plants and/or system overall; and/or the location of equipment (e.g., pucks and/or combs, described in detail below) throughout the facility.

Embodiments may be configured to accommodate and/or encourage a variety of plant characteristics. Plant characteristics of one or more biological entities being farmed may describe, in a non-limiting manner, one or more of the following attributes (some of which are described in greater detail below): mass of the biological entity; color [in visible and nonvisible wavelengths] of the biological entity; sugar content of the biological entity, acidity of the biological entity, size of the biological entity; shape of the biological entity; morphology of the biological entity; growth rate of the biological entity; texture of the biological entity; temperature of the biological entity; area of the biological entity subject to illumination; area of the biological entity subject to airflow; root area subject to irrigation; and/or the consideration of one or more of these plant characteristics over time.

Embodiments may provide specific structural features that may facilitate plant growth. At its most basic level, a plant may be supported by a growth medium and a surrounding support structure that secures the growth medium. Herein, the combination of these two components is called a "growth puck." The growth puck, with or without the growth medium and biological entity, may be subject to movement through a "puck respacing mechanism." Some components that the respacing mechanism may interface with may include, but are not limited to, the growth puck and a growth module ("comb"). The comb may be a component that can store many pucks, for example pucks stacked on top of one another, while allowing the plant housed by the growth puck to extend its roots and its foliage out of either side of the comb. A "sensor puck" may serve as a sensor suite that may determine one or many environmental characteristics and/or plant characteristics within the controlled environment. A "spacing puck" may increase the space between biological entities in the growth pucks. The generic term "pucks" may encompass the various types of pucks listed above and/or other puck variations.

The comb may be responsible for maintaining the collective orientation and structural rigidity of one or more growth pucks. The movement of these combs throughout the lifecycle of the plant, throughout the facility, may be managed by one or more mobile robots called "frogs." A frog may move growth modules between the respacing mechanisms and the growth structures, for example. Frogs may communicate with each other through a base communication station that may also relay a number of task directives, for example managing the task sequences for the frogs.

Frogs may be configured to perform one or more "frog functions," which may encompass the tasks that the frog is capable of performing. These tasks may include, but are not limited to, the following: comb or growth module movement within and outside of the growth arena; light re-spacing closer-to and/or further-from the surface of the comb or growth module; light replacement/removal to/from the growth arena; cleaning, sterilization, and/or movement of the column's cavity structure, nozzles, and/or channel system; data collection of plant characteristics and/or environmental characteristics and transmission of that and/or other data; trimming, thinning, pollination, nutrient delivery, illumination, maintenance, and/or manicuring of the biological entities; harvest, planting, and/or removal of biological entities; pest control and/or disease mitigation; audio delivery to the growth arena; atmospheric control; electromagnetic field manipulation; laser-based manipulation of the biological entity; communication networking; structural inspection within the growth arena; warehouse logistics management of things other than plants and biological entities; packaging harvested goods; storing growth modules, combs, and/or plants for certain periods of time; frog rescue [which may entail one frog pushing another frog around the facility in order to remove it from being in the way of other frogs and also delivering it to the frog elevator, recharge station, and/or a dead zone where frogs traditionally do not operate]; and/or assembly, cleaning, maintenance, emergency operations, and/or servicing of the system.

In some embodiments, frogs may operate autonomously atop a matrix of rails mounted to the top of a "growth structure," which may support rails on which the frogs move and/or support the pucks. The growth structure may support many other subsystems in the controlled environments. The subsystems may include, but are not limited to, the following: a "lighting system" that may be responsible for illuminating the biological entity; a "power distribution system" that may be responsible for delivering power to lights, sensors, solenoids, actuators, and/or various other subsystems; columns that may provide support, alignment, and/or housing of combs; a "fluidics system" that may be responsible for delivery of gaseous and/or aqueous solutions to plants' root zones; and/or, among other subsystems, rails for frogs to translate across the top of the growth structure. Frogs may continuously reconfigure the array of combs housed in the columns of the growth structure, as well as performing a number of other tasks within the facility.

The growth structure may include a set of structural members that act as support for the frogs' rails and the support of the growth cavities called "columns." Columns may include a vertically oriented set of rails that may act as guides for the combs as they are lowered from the frog. Columns may provide a barrier structure that may isolate the roots of the plants from the foliar atmosphere and may contain the nutrient mix from escaping the internal cavity of the column. The internal cavity of the column may be enclosed by one or two horizontally opposed sets of growth modules and side barriers that may be connected between the rails.

Within a column's cavity, a fluidics system may be responsible for delivery of the nutrient mixture to the back face of the comb where roots may be are protruding from the back side of the respective growth pucks. The fluidics system may deliver the nutrient solution through pipes, hoses, jets, nozzles, and/or various connection mechanisms.

Columns may include, on either side, one or more lights. For example, plants may grow towards a set of lights that are horizontally opposed. In some embodiments, the lights may include LED lighting components and/or other lighting components that may emit a specific quality and intensity of light that may be tailored to the crop in the comb adjacent.

A system of ducts may be provided for regulating the temperature, humidity, $CO_2$ concentration, $O_2$ concentration, velocity, and/or direction of the air between the lights and the plants. The ducts may deliver conditioned air back the foliar atmosphere and/or may remove older air from the enclosure.

A combination of computational hardware and software, referred to herein as a "control system," may perform control of the vertical farming facility. The control system may include a collection of hardware that may include, but is not limited to, the following: a sensor or collection of sensors transducing the atmospheric composition of the foliar atmosphere, root-zone atmosphere, growth arena atmosphere, Facility atmosphere and external atmosphere; a sensor or collection of sensors transducing the state of the fluids being delivered to the plants on both the foliar and root side; a sensor or collection of sensors transducing the state or some characteristic of the plant [including but not limited to size, morphology, color in multiple spectrums, etc.]; a sensor or collection of sensors transducing the state of the system for the planning of logistics, sequencing, and/or other tasks for automated and manual execution; a piece or set of hardware that interacts with the sensors to transmit, receive, store, manipulate, and/or visualize data; and/or a system of stationary and mobile digital imagery devices that capture, record and transmit imagery and/or video to determine a characteristic of the controlled environment, and/or characteristic of the plant, and/or a characteristic or state of the system.

On top of this hardware, the control system may include a software stack and/or one or more processors executing the software modules in the stack. The software stack may be responsible for the operation of the entire vertical farming facility. The control system may include one or many of the following: a software module responsible for the regulation of the electrical conductivity (EC) of the nutrient solution; a software module responsible for the regulation of gaseous and aqueous temperature; a software module responsible for the regulation of airflow in the root zone, foliar zone, enclosed environment, and/or external environment; a software module responsible for the regulation of air pressure; a software module responsible for the regulation of gaseous and aqueous $CO_2$; a software module responsible for the regulation of gaseous and aqueous $O_2$; a software module responsible for the regulation of nutrient concentrations within the nutrient solution; a software module responsible for the regulation of water and nutrient flow; a software module responsible for the regulation of pH; a software module responsible for the regulation of oxidation reduction potential (ORP); a software module responsible for the regulation of the movement of pucks around the facility; a software module responsible for the regulation of the movement of combs throughout the facility; a software module responsible for the regulation of the quality and intensity of light within the growth arenas; and/or one or more software modules responsible for one or more combinations thereof.

Embodiments may include sensors, which may be wired or wirelessly connected to computational hardware that may be responsible for the receiving, storing, manipulation, and/or transmission of data. Sensors may be found in many locations within and outside of the controlled environment and/or mounted to various stationary and mobile devices or structures such as, but not limited to, the following: sensor pucks within the comb; sensors or sensor suites housed on the growth structure; and/or sensors or sensor suites mounted to the frog and/or its subsystems. Sensor pucks may be responsible for sensing environmental characteristics and/or plant characteristics in the root zone of the controlled environment and/or the foliar zone of the controlled environment. Sensors mounted to the growth structure may be responsible for sensing environmental characteristics and/or plant characteristics in the root zone of the controlled environment and/or the foliar zone of the controlled environment. Sensors mounted to the frog may be responsible for the transduction of environmental characteristics and/or plant characteristics within and/or outside of the controlled environment.

Stationary and/or mobile sensor and/or sensor suites may include, but are not limited to, the following: gaseous and/or aqueous temperature sensors; gaseous and/or aqueous $CO_2$ and $O_2$ concentration sensors; aqueous pH sensors; ORP sensors; aqueous and/or gaseous flow sensors; aqueous and/or gaseous pressure sensors; gaseous humidity sensors; aqueous nutrient concentration sensors; aqueous electrical conductivity sensors; light quality sensors; light quantity sensors; digital imaging devices; hall-effect sensors; optical sensors; scanners; light spectrum transducers; and/or aqueous sensors involved in the transduction of at least one of the following: nitrogen, phosphate, potassium, calcium, magnesium, copper, chlorine, boron, sulphur, zinc, molybdenum, iron, and manganese.

Embodiments disclosed herein may transmit data among subsystems and/or outside devices. Systems that may be involved in the transmission of data may include, but are not limited to, the following: a transmitter that transmits data; a receiver that receives data; a transceiver that both sends and receives data; and/or a configuration of transmitter, receiver, or combination thereof (e.g., transceiver) that is either wired or wireless. The data, from a host of stationary and mobile sensors and sensor suites, may be used to determine and/or monitor the environment within which the plants are growing. This automated monitoring system, in conjunction with software modules/algorithms/programs, may allow the system to adjust one or a number of environmental characteristics through a number of different actuation mechanisms in order to improve the plant characteristics of the biological entity.

For example, through consideration of the transduced environmental characteristics and/or plant characteristics being accumulated through the sensors and the software modules that ingest, store, and/or manipulate this data, the control system may be capable of making informed decisions regarding the controlled environment's operation and implementing changes to the environment through various actuation methods. Hardware and/or software that may be used to execute such tasks may include, but is not limited to, one or more of the following software modules: a software module to accumulate and store data from some or all of the data accumulation devices within and outside of the controlled environment; a software module to analyze and manipulate this incoming data; a software module and/or algorithm responsible for ingesting the desired data and outputting determinations and recommendations regarding the controlled environment and the actuators that control the controlled environment to improve the characteristics of the controlled environment; a software module to transmit recommendations, wirelessly or by wire to another computational hardware device that connects to the actuators that control the controlled environment; a software module that receives the instruction data and/or engages the actuators in a desired manner to improve the environmental characteristics of the controlled environment, in order to improve the plant characteristics of the biological entities within the farm; and/or one or more software modules responsible for one or more combinations thereof.

The process from environmental characteristic and plant characteristic transduction through actuation of various components to improve said characteristics may include continuous reevaluation and modification of the controlled environment to ensure optimal environmental characteristics, creating a closed-loop control system that manages the operation of the farm. Locally, and/or in the cloud, a collection of software modules may be responsible for not only storing the data that is accumulated, but also for the responses determined and implemented by the control system and/or the effects of these decisions on the environmental characteristics and plant characteristics.

Some embodiments may leverage the combination of desired environmental characteristics and plant characteristics and real-time and historical data flowing from the farm to learn using machine learning and/or artificial intelligence. A set of software modules and algorithms may take in the data from the farm and compare it to historical data. If the system discovers a perceived improvement in the output plant characteristics, the system may update the environmental characteristics implemented in the next growth of the same crop. Using Internet of things (IoT) and/or other sensor arrays and big data-sets, the system may begin to learn how to grow specific crops optimally in any facility.

To support the overall collection and management of data within the vertical wall indoor farm and to support the ability to extract and analyze semantically meaningful data from that data and to represent and act on that information, some embodiments may include a cloud-based software architecture that may be remote from the physical site of the farm. The data about plants and equipment in the indoor farm may be sent to the cloud through a data collection system that has been designed for indoor farms. The system may send the data to the cloud using the sensors and transmission hardware described herein. In the cloud environment, the data may be collected and organized into relational and/or non-relational databases. An index that uses indoor farming domain information may be used to organize and access the data. The collected information may be transformed into a real-time assessment of the state of the various indoor farms. Much of this transformation may be generated by machine learning algorithms that may detect patterns in the data and detect anomalies and problems and/or interesting patterns of behavior. The state information may be used to continuously evaluate the state of the system and schedule control actions for the farm, to improve plant characteristics (such as changing nutrients, lighting, or environmental conditions), and/or the robots and automation. This closed loop control systems may reside in the cloud and/or may be maintained locally at the site of the farm for redundancy and security. A user interface may be provided to enable farming domain experts and others to monitor the information and control actions of the system.

The cloud-based information management system may be organized by an indoor-farming specific knowledge representation. This knowledge representation may include a semantic representation of entities involved in the plant growth. The representations may be used to model the biological and physical environment within and outside of the facility and may be be used by other software algorithms to monitor performance, detect anomalies, and/or design and plan control actions, for example.

The representations may be organized into three major categories. The first category may be information about plants. Each plant grown in the indoor farm may be uniquely represented through its life-cycle. This may include continuously characterizing the state of the plant at each stage from germination to harvest. These characterizations may be obtained from extracted sensor data information and may be probabilistic in nature.

The second category may be recipes. Recipes may include representations of knowledge about how plants should grow. This may include information about the various environmental characteristics to which the plant is subjected. It also may include models of the desired state of the plant at each stage in its life cycle. The recipes may include the desired final nature of the plant (e.g., the plant characteristics). Thousands (or more) of recipes may be developed to represent different varieties of plants and plants having different output plant characteristics. The recipes may contain information about possible anomalies or diseases that might be associate with each specific plant.

The third category may be physical entities in the indoor farm. These may include the physical environment, such as growth modules/combs, columns, pods, frogs, etc. These may also include the operating subsystems, such as fluidics, lighting, HVAC, sensors, and other subsystems. For each physical entity, the expected characteristics and operating modes may be represented along with the state of the subsystem at various times.

Some embodiments may include systems configured to diagnose a state of and/or anomalies with plants growing within the indoor farm. This plant environment diagnostic software system may reside in the cloud in some embodiments. The plant environment diagnostic software system may use the knowledge representations to compare actual plant status and behavior (per the data collected from sensors and extracted into the knowledge representations) with the expected behavior represented in the recipes. This diagnostic system may evaluate the state of each plant and may provide a probabilistic rating of how well the plant's state matches the recipes. The diagnostic system may detect possible pests, diseases, or other anomalies that may be present in the plant. This may be done by comparing the plant information in the recipes with information collected and represented about the plant, for example. The system may work independently on each plant in the indoor farm.

Detection methods used by some embodiments may be based on a Bayesian model. For example, the system may develop a set of hypotheses from the recipes about the expected state of the plants. There may be hypotheses about the presence of pests or diseases in the plant. The algorithm may compute the probability of a hypothesis being true given the evidence—$P(H|E)$—the probability of the hypothesis (H) being true is conditional on the evidence (E) collected. This may be accomplished by computing the probability of observing E given H—the likelihood that such evidence would exist given the hypothesis. This may be multiplied by the likelihood of each hypothesis existing, which may result in a list of probabilities for each hypothesis.

As more data is collected and as recipes are developed, the software system may be able to "learn" new information about recipes and about the hypotheses about the observed state and behavior. This recipe learning system may compare each hypothesis developed with a ground truth model that may indicate how well the system performed in assessing the probability of that hypothesis. Ground truth data may be obtained by observing the actual outcome of various plants using both automated and manual training methods. The system may automatically adjust the prior probability of a hypothesis. This may enable the system to improve its methods of confirming or refuting hypotheses. The system may also detect patterns of behavior and plant growth outcome that may suggest alternative ways to grow the plants.

The software architecture, knowledge representations, and/or diagnostic and analysis tools may be applied to multi-farm data collection and management. The system may be centralized in one or more cloud locations, but may have access to the growth and performance data of information collected world-wide. The system may uniquely analyze and compare data from many locations and plant types to better accomplish its analysis and recipe Learning.

FIG. 1 shows a growth structure 101 according to an embodiment of the disclosure. Considering one or many growth structures 101 within a facility, a plurality of structures called pods may be built adjacent to one another and each may include one or more columns as described in FIG. 1. Growth structure 101 may be an enclosed environment wrapped in a specifically thermal- and light-resistant material to isolate the structure from the environmental conditions outside of the growth structure 101. The pods may be characterized by the volume and components between a pair of uprights 103 and 104 of various and configurable heights (18 foot and 24 foot uprights, respectively, in this example) that may be connected by a number of load beams 102 at various heights along their vertical axis of the upright. The pods may be used for the structural support of the columns in FIG. 2, though they may have the capacity to house different subsystems like fertigation, power distribution, power storage, growth module transfer area, etc. These columns in FIG. 2 may be responsible for the positioning and housing of combs (e.g., see FIG. 4A) or growth modules (e.g., see FIG. 4B). These growth modules/combs may be populated by various configurations of biological entities (e.g., see FIG. 3A) that may be subject to optimal and varying lighting, nutrient, and atmospheric conditions called environmental characteristics. Growth modules/combs may be relocated by one or more frogs (e.g., see FIG. 7) which may translate and actuate atop a system of rails (e.g., see FIG. 17). In addition to being used for growth, structures 101 may be used for pre-processing, post-processing, storage, control, viewing, maintenance, and/or hardware. These areas may be configured and constructed in such a way that they are incorporated into a form factor that is compliant with the warehouse and the pallet racking structures being used to house the facility.

Figure 2:
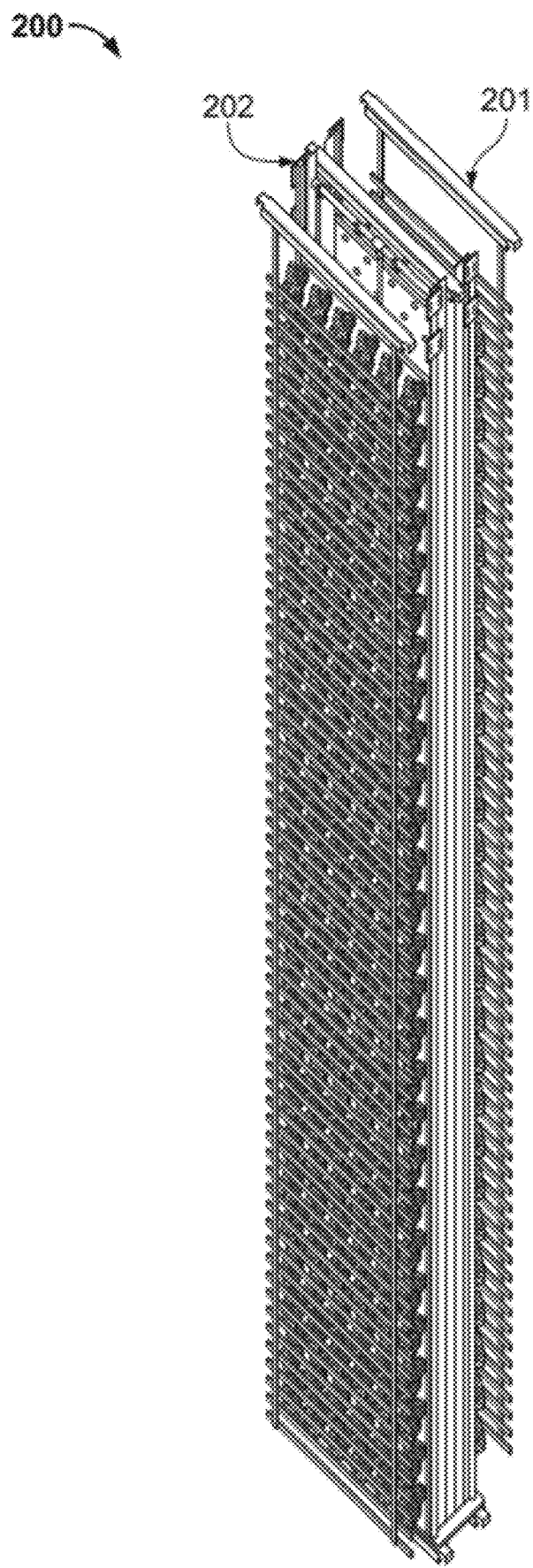
FIG. 2 shows a growth structure column according to an embodiment of the disclosure.

FIG. 2 shows a cavity or column 200 according to an embodiment of the disclosure. The growth structure 101 may include a collection of pods supported by uprights 103/104 and load beams 102. The growth structure 101 may include pallet support beams (e.g., see FIG. 3A), row spacers (which may define the lateral distance between uprights 103/104), and bolts securing the feet of the uprights 103/104 to the surface upon which the growth structure 101 stands. Pods may be populated with a plurality of cavities or columns 200. Detachably attached to the growth structure 101 may be a set of channels (e.g., see FIG. 3A), fluidics Lines (e.g., see FIG. 3A), light columns 201, nozzles (e.g., see FIG. 3A), drainage trays (e.g., see FIG. 3B), HVAC ducting, and sensors that collectively may comprise a column 200. A plurality of these columns 200 may be arranged adjacent to one another, in variable spacings, to constitute a pod. A plurality of these pods reside in a volume known as the growth arena 101. One or many of these growth structures 101 may be combined to create a facility.

FIG. 3A shows a detailed view of cavity or column 200, in which top of the cavity is highlighted in FIG. 3A and the bottom of the cavity is highlighted in FIG. 3B according to an embodiment of the disclosure. Cavity 300 may be made up of various components that may mount to the growth structure 101 and may contain the nutrient solution being delivered by the fluidics. A light column 2500 may hang from pallet support beams mounted on the growth structure 100. A light column may include a pallet support beam 301 and a plurality of LED lights 308 and 322 that may be suspended by vertically oriented straps 307. The cavity 300 may have a pair of cavity channels 304 that may be connected to each other via a piece of corrugated plastic 302 or other material, called the corrugated plastic barrier, that may be mirrored between two load beams. The combination of cavity channels 304 and the corrugated plastic barrier 302 form a grouping called a skirt. There may be a skirt on both sides of the cavity 300 facing inwards toward the cavity fluidics system, which may include nozzle 309 and fluidics lines 312. Cavity channels 304 and 321 may be mounted by skirt mounts 305 to a load beam at various heights to ensure rigidity and position maintenance. These cavity channels 304 may be responsible for guiding the growth module/comb 313, and the biological entities 310 supported by it, into and out of the frog to its desired position in the growth structure, then keeping it secure from falling or contortion whilst also ensuring that no nutrient solution escapes from the column's cavity. The pallet support beam 306 may mount to the load beams at either end by pallet support mount 303 and may provide support for the cavity fluidics system. The cavity fluidics system may be supported by the pallet support beam 306 through a set of cavity fluidics support hooks 311, which may allow for simple insertion and removal of the cavity fluidics system.

FIG. 3B shows a cavity fluidics system according to an embodiment of the disclosure. The cavity fluidics system may include various components that deliver a nutrient mixture to the roots protruding out of the growth modules/combs situated in the column. The nutrient mixture may enter through a bulkhead gasket through the bottom of the drainage tray 324 that is being supported by pallet support beam(s) 323 at the bottom of the cavity. The nutrient mixture may travel through a fluidics line 312 (e.g., a PVC pipe) to be split into a varying number of nutrient delivery lines. The configuration of the nutrient delivery lines may be based upon the desired nutrient distribution pattern and dimensions within the column's cavity. Nutrient solution that does not get absorbed by the biological entity may flow downward to be collected in the drainage tray 324, then further distributed from a drainage bulkhead gasket back to the more centralized fluidics system that the nutrient solution came from.

Figure 4B:
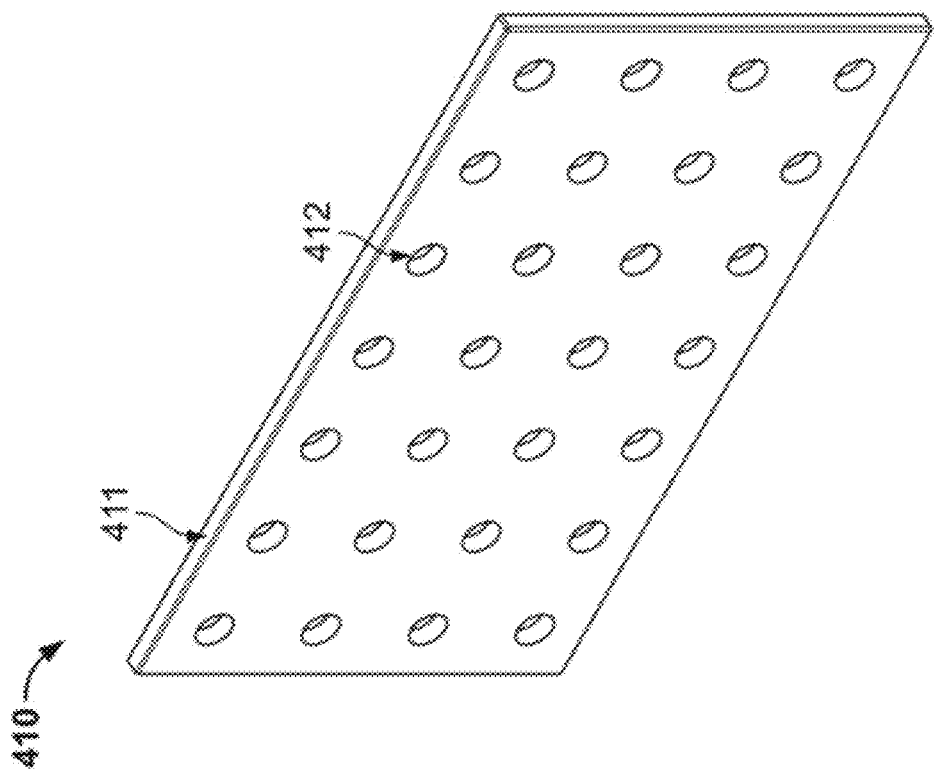
FIG. 4B shows a growth module according to an embodiment of the disclosure.
Figure 4A:
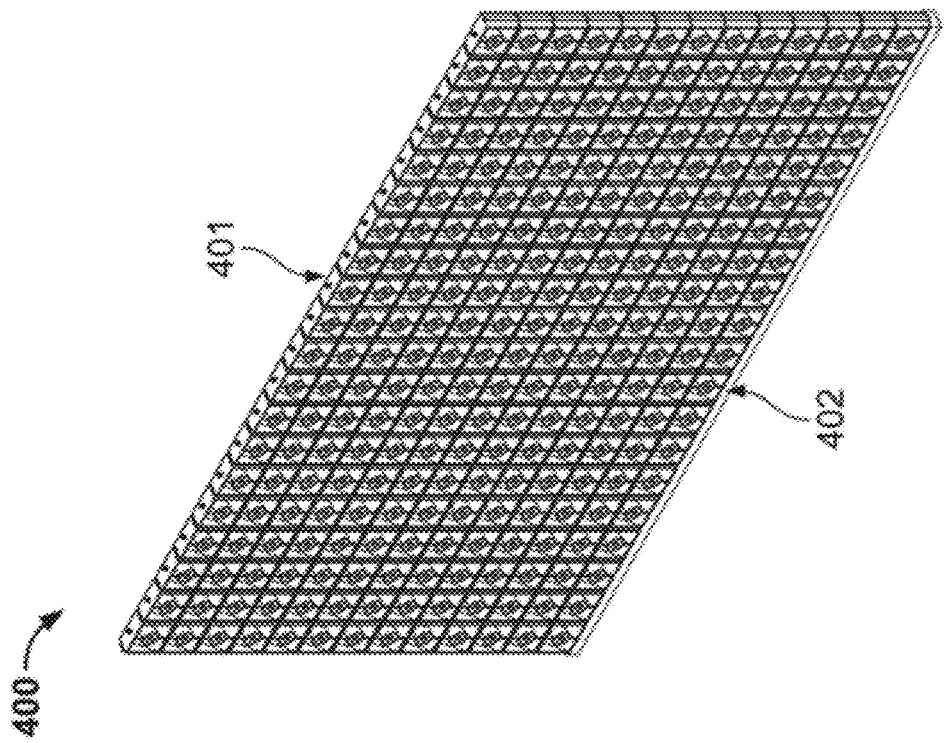
FIG. 4A shows a comb according to an embodiment of the disclosure.

FIG. 4A shows a comb 400 according to an embodiment of the disclosure. The comb 400 may be configured to organize and secure a group of pucks, such as growth puck 401. The comb 400 may be a collection of many growth pucks 401, "sensor pucks," and "spacer pucks" in any number of layers and configurations. The comb 400, in this incarnation, may include a horizontal member 402 made from formed sheet metal with fasteners (e.g., PEM fasteners) placed at intervals along the member. These PEM fasteners may align with the growth puck alignment hole (e.g., see FIG. 5b) on the top of the growth puck 401 so that the puck's first layer is in a known configuration to dictate the placement of more pucks on top of that first layer. In this example, the dimensions of the comb 400 are 40 inches wide and 24 inches tall, though the height and width may be variable. Combs 400 may be picked up by the bottom member through a slightly varied module acquisition payload as outlined in this document. Any number, combinations, and configurations of growth pucks 401, sensor pucks, and spacer pucks may be provided.

FIG. 4B shows a growth module 411 according to an embodiment of the disclosure. In some embodiments, growth module 411 may be an off-the-shelf, 4 foot by 2 foot component. Growth module 411 may be made out of polystyrene foam or another material with growth module holes 412 formed therein. The holes 412 may be bored out in various configurations [staggered, square; 18 holes, 36 holes, 72 holes, etc.] to accommodate different crops with different static and dynamic spacing needs. These non-dynamic plant-spacings may be used in place of the comb 400 with its dynamic plant spacing capabilities in some cases. The combs 400 and growth modules 410 may be a similar form factor such that they may both be interchangeable platforms for growth of the biological entity inside and outside of the growth arena.

Figure 5B:
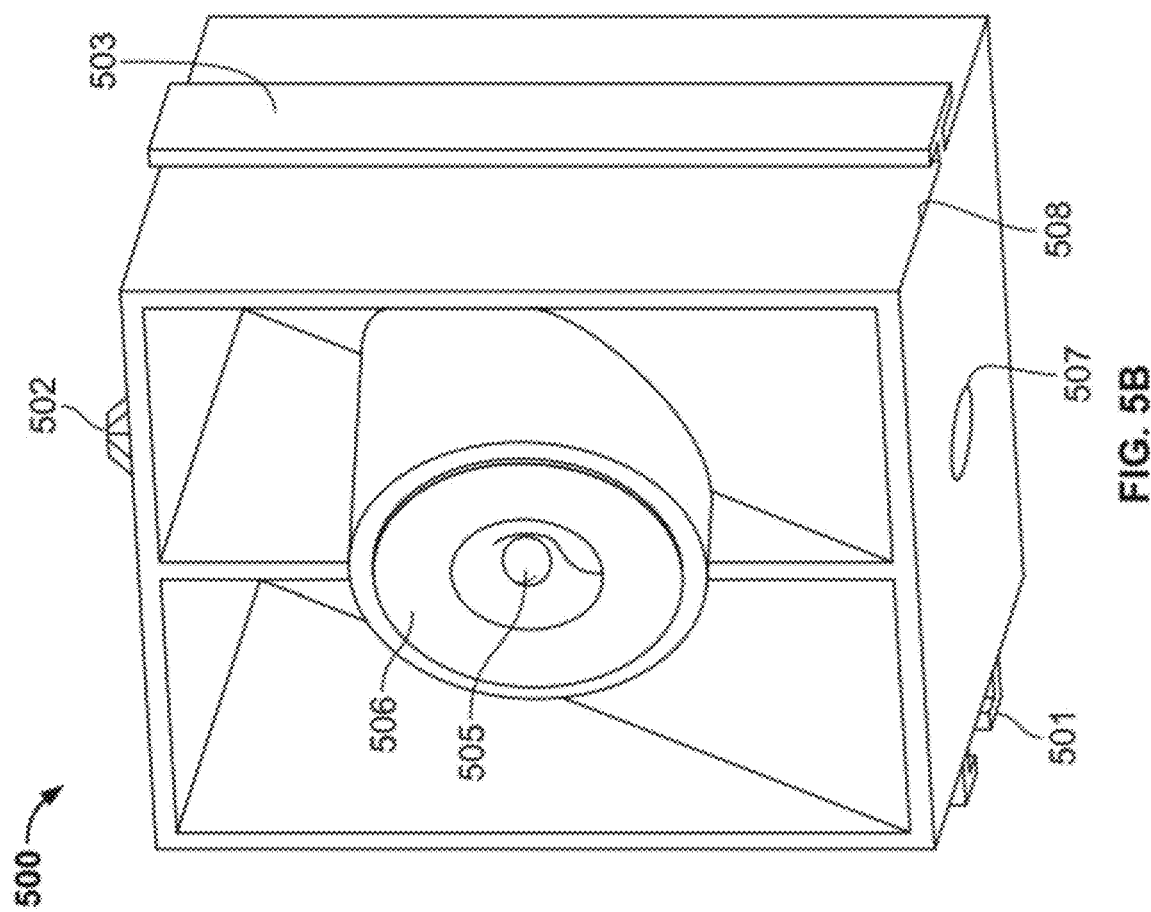
FIGS. 5A and 5B show a puck according to an embodiment of the disclosure.
Figure 5A:
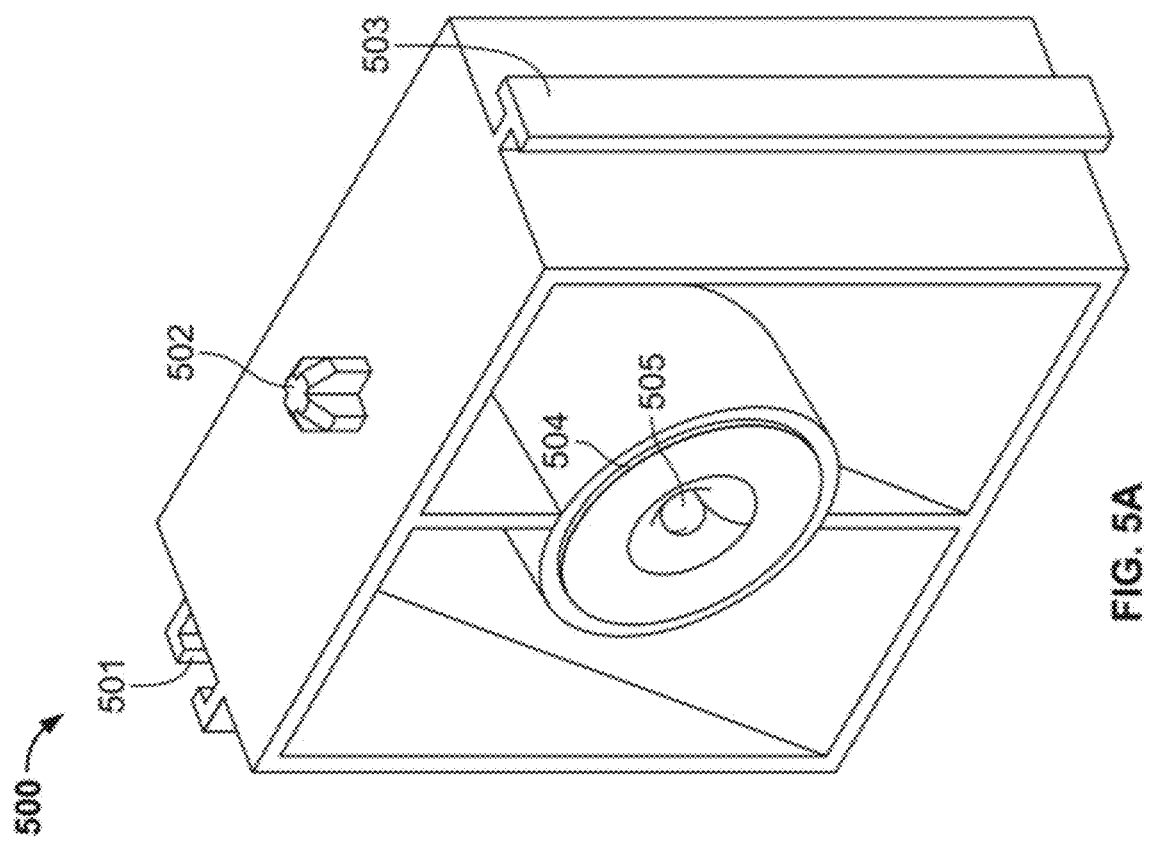

FIGS. 5A and 5B show a puck 500 according to an embodiment of the disclosure, where FIG. 5A shows the puck 500 from a top side, and FIG. 5B shows the puck from an underside. For example, puck 500 may be a growth puck, which may be the component responsible for housing, supporting, and orienting the biological entity 505. Puck 500 may have an opening 504 where the growth medium 506 and biological entity 505 may be slid in at one or various times throughout the lifetime of the biological entity 505, for example at the beginning of the biological entity's lifecycle. Puck 500 may allow for the biological entity 505 to be moved around individually without causing harm to any portion of the biological entity. Pucks 500 may be configured to interlock with each other in two or three dimensions such that they can be arranged in an array and thereby form a comb.

When the growth puck 500 is placed onto the comb's 400 horizontal member 402, the growth puck opening 504 may align with features along the horizontal member 402 that may be configured to properly space the growth pucks 500. The female alignment channel 501 and the male alignment channel 503 may be used to interlock the growth pucks 500 together. When a growth puck 500 is lowered down onto another growth puck 500, the growth puck nub 502 of the growth puck 500 below may engage the growth puck alignment hole 507 on the growth puck 500 being lowered. In conjunction with the male 503 and female 501 channels, the growth puck 500 may be secured in-place within the comb 400 using these alignment and securing mechanisms. There may or may not be a gradient 508 on the top and/or bottom surfaces of the puck 500 to ensure that any stray liquid may flow back into the cavity rather than out toward the foliar zone.

A growth puck 500 may include the growth medium or have the capacity to securely house a separate growth medium. Pucks 500 may be made of a number of materials, including but not limited to, the following: polyethylene, ABS, polypropylene, polystyrene, polyvinyl chloride, etc. Pucks 500 may be negatively and/or positively buoyant. Pucks 500 may be a variety of colors. In some embodiments, colors may be chosen to provide contrast against the plant matter. Each individual growth puck 500 may be tracked using the farm's operating system to make sure that the data associated with the plant being observed is stored with reference to the correct biological entity/growth puck 500.

The growth puck 500 may be configured to interface with a puck respacing mechanism that may relocate growth pucks within combs to correspond to the requirements of the plant. This interface between the growth puck 500 and the puck respacing mechanism may include a variety of different mechanisms, including but not limited to, the following: friction, magnetic, suction, etc. The pucks 500 may combine together within the comb's 400 matrix to limit or prevent the escape of fluid from the root cavity and/or to limit or prevent light from entering the root cavity. Pucks 500 may be any number of different shapes and sizes. Pucks 500 may be made of multiple components or a single component.

Some pucks 500 may be spacer pucks, which may also interface with the comb 400 and the puck respacing mechanism. The spacer puck may be used to increase the distance between growth pucks to mitigate leaf overshadowing and therefore optimize plant spacing. Spacer pucks may be made of the same material(s) as the growth puck and may potentially be the same shape and/or dimensions as the growth puck, though in some embodiments they may be of different size and/or construction. Spacer pucks may be the same dimensions as the growth puck, though not necessarily. Spacer pucks may use the same securing mechanisms (male and female channels, nub and hole) as growth pucks to interlock into the comb's array seamlessly. The spacer puck may be a passive entity that may provide optimal spacing between growth pucks and sensor pucks and that may ensure no light enters the root-zone cavity and no nutrient spray escapes the root-zone cavity. Spacer pucks may also serve as a truth reference for the vision processing system in terms of reflectivity, dimensions, locations, angles, position, and other truth data, as described below.

Some pucks 500 may be sensor pucks, which may also interface with the comb 400 and the puck respacing mechanism. The sensor puck may provide data descriptive of the boundary layer of air beneath the canopy of the plants and also data descriptive of the root-zone environment. Enabled by improving battery technology and distributed wireless sensors networks (IoT), the sensor puck may be placed strategically within the comb 400 to allow for optimal spacing of growth pucks. The sensor puck may deliver data wirelessly back to a more centralized computer in some embodiments. Sensor pucks may be made of the same material(s) as the growth puck and may potentially be the same shape and/or dimensions as the growth puck, though in some embodiments they may be of different size and/or construction. Sensor pucks may be the same dimensions as the growth puck, though not necessarily. Sensor pucks may use the same securing mechanisms (male and female channels, nub and hole) as growth pucks to interlock into the comb's array seamlessly. Sensors within the sensor puck may transduce environmental characteristics such as temp, air flow, humidity, light intensity, and light quality among other things, and even plant characteristics as well in some embodiments. When the comb 400 is brought to the plant respacing mechanism, as described below, these sensor pucks may remain in the comb or may be removed for maintenance, recharging, cleaning, or replacement.

The "puck respacing mechanism" may be the mechanism that is responsible for the pucks 500. The puck respacing mechanism functions may include, but are not limited to, the following: acquisition/placement of pucks [growth pucks, spacer pucks, sensor pucks] into and out of the comb; placement and acquisition of pucks onto and from transport mechanisms [e.g. conveyor lines] delivering and removing pucks to/from the puck respacing mechanism; and/or positioning of pucks directly into other subsystems [e.g. cleaning, image capture, puck rotation, etc.].

Figure 6:
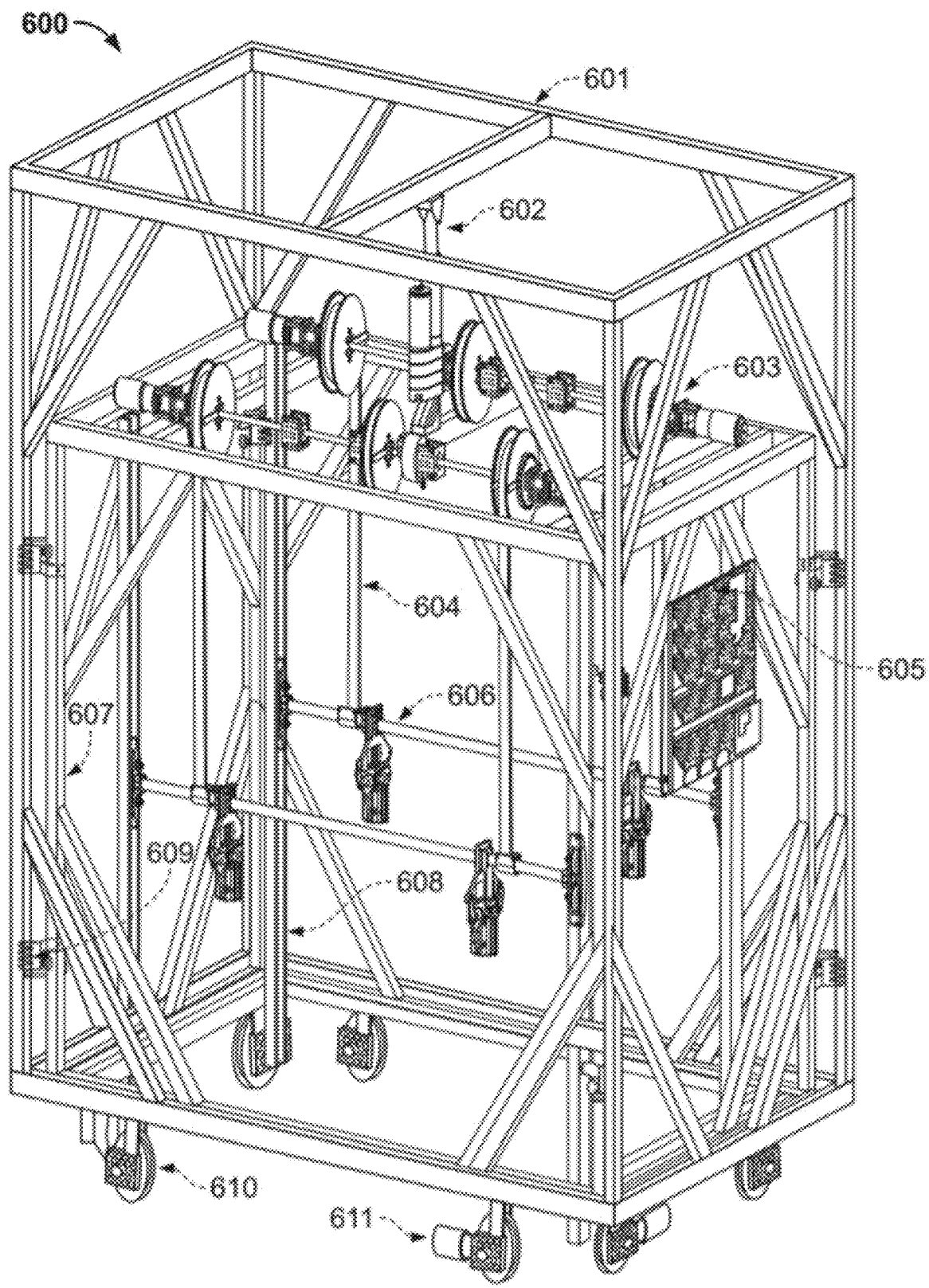
FIG. 6 shows a frog assembly according to an embodiment of the disclosure.

FIG. 6 shows a frog 600 assembly according to an embodiment of the disclosure. The frog 600 may be an automated wheeled robot that may be designed for singular or multi-robot implementations. The frog 600 may be responsible for the automation of tasks and subsystems within the facility. The term "frog" may refer to any variation of the frog 600 that is responsible for any of the frog's functions outlined herein. In some embodiments, different frogs 600 may vary in hardware, dimensions, software, and any other characteristic or capability laid out within this document.

The frog 600 may include an outer frame 601 and an inner frame 607 that may be raised and lowered to change the direction of travel using a linear actuator 602. Inner and outer frame guides 609 may maintain alignment between the outer frame 601 and inner frame 607. Some combination of passive wheels 610 and/or active wheels 611 may give the frog 600 the ability to actuate along rail mechanisms. Within the inner frame 607 there may be some combination of one or many elevation mechanisms 603 and/or payload bars 606. In this incarnation, the elevation mechanism 603 may be connected to the module acquisition system 606 by a set of retractable straps 604. The frog's channels 608 may work in conjunction with the elevation mechanism 603 and module acquisitions system 606 to guide the growth module/comb into and out of the frog 600. There may also be a set of computational hardware in the frog's brain 605 that may control activities of the frog 600.

In some embodiments, the frog 600 may be a battery powered, multi-wheeled robot that may have the capacity to locate itself within a facility, communicate to and from a ground controller and/or other frogs 600, operate autonomously based on directives received by those other subsystems, and/or and automatically return for maintenance, recharging, hard-wire data transfer, recalibration, or downtime in a designated area in the growth arena.

In some embodiments, the coarse positioning of the robot may be known and controlled through an ultra-wide band system of anchors and tags that may be used to locate the frog 600 in three-dimensional space. The anchors may be placed in various locations throughout the facility, and the tags may be located on each individual frog 600 (e.g., on a top surface). The ultra-wide band system may provide information to the frog 600 describing exactly where it is and over which junction it resides with an accuracy of ±10 cm in some embodiments.

In order for the frog 600 to achieve position control of ±2.5 mm accuracy in some embodiments, a fine-positioning control system called the junction alignment sensor may be provided on the frog 600. The frog 600 may use a number of mechanisms for fine position control; described here are three of those many potential options described as junction alignment sensors.

A first position control option may use hall-effect sensors and magnets. At the corners of each junction within a facility, there may be 4-way PVC connectors (e.g., see FIG. 20 below) that may house a magnet in a defined location. The frog 600 may include a hall-effect sensor that may sense the magnetic field flux as the frog 600 arrives at the junction. A microprocessor on-board the frog 600 may detect the peak magnetic field flux and may detect how many encoder counts past the peak magnetic field flux the frog 600 traveled as it slows. The frog 600 may reverse the exact number of encoder counts to align itself properly with the magnet.

A second position control option may employ a system of distance sensors to determine a frog's 600 position above the junction. Two groups of two distance sensors may be attached to the bottom of the inner and outer frame of the frog 600. These distance sensors may be oriented such that their beam is sent downwards at a 45° angle toward the central long axis of the rail, for example a PVC pipe. As the frog 600 arrives at a junction, the pair of distance sensors that are positioned to detect the rail with the long axis parallel to the direction of travel may remain passive. The pair of distance sensors that are oriented to detect the rail perpendicular to the direction of travel may be engaged. As the rail is detected by the distance sensors, the distance sensors may look to achieve an identical distance from each distance sensor. This may signify that the frog 600 may be positioned directly above a junction, therefore it can actuate in either direction or engage the components (e.g., growth modules) beneath it at that junction.

Another position control option may include a vision system. As the frog 600 translates atop the growth structure, a set of cameras on the frog 600 may fixated on the rail system. Variations in the rail system may signify various things to the frog 600. For example, a camera at the corner of the frog 600 gazing straight down at the pipe may provide information allowing the frog's 600 processor to able to determine the location of the 4-way PVC connector using various vision processing algorithms. In some embodiments, the frog's 600 brain (e.g., a microprocessor) may expect a certain feature in the image to be represented by specific colors and light intensities on certain parts of the camera's sensor. At the moment the camera identifies, isolates, and dynamically tracks those features, the frog 600 may translate to a position where those features are appearing in the correct location on the camera's sensor, signifying correct positioning of the frog 600 above a junction.

In all of these fine positioning scenarios, a microprocessor in the frog's brain 605 may execute a closed feedback to find the predetermined optimal location. When that location is found within some tolerance, the frog 600 may set all 8 of its wheels onto the rail to ensure that the positioning of the frog 600 is correct. The frog 600 may use the rail system as a reliable reference for correct positioning of the frog 600 by dropping all 8 wheels onto the junction.

The frog's brain 605 may be responsible for the decision making and execution of the frog's directives to the actuators on board, and the communication of information to systems outside of the frog 600. The frog's software flowchart (see FIG. 14 below) outlines an example iteration of the frog's software loop. As described below, the software may consider communications with ground controller, emergency handling, task scheduling, and task fulfillment, for example.

Figure 7:
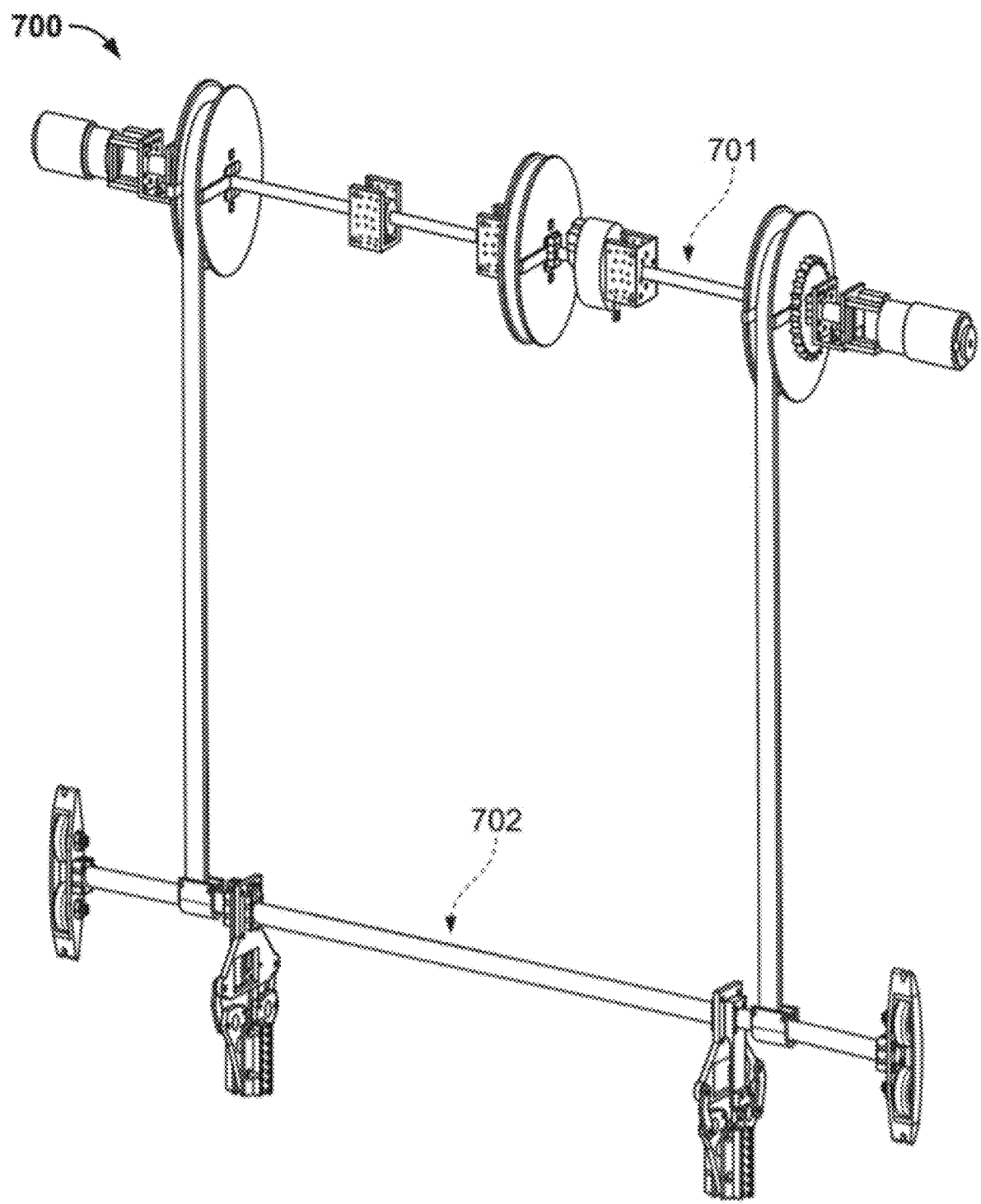
FIG. 7 shows a tool assembly according to an embodiment of the disclosure.

FIG. 7 shows a tool 700 assembly according to an embodiment of the disclosure. The tool 700 may include an elevation mechanism 701 and payload bar 702. Considering the array of frog's functions, the tool 700 may provide either an interchangeable subassembly that the frog 600 may actively swap in and swap out, or the tool 700 may be a fixed subassembly that is not interchanged. The elevation mechanism 701 may be connected to the payload bar 702. This tool combination may be used for growth module and/or comb acquisition and deposition. Various tool combinations may be used to complete the other frog 600 functions within the facility.

Figure 8:
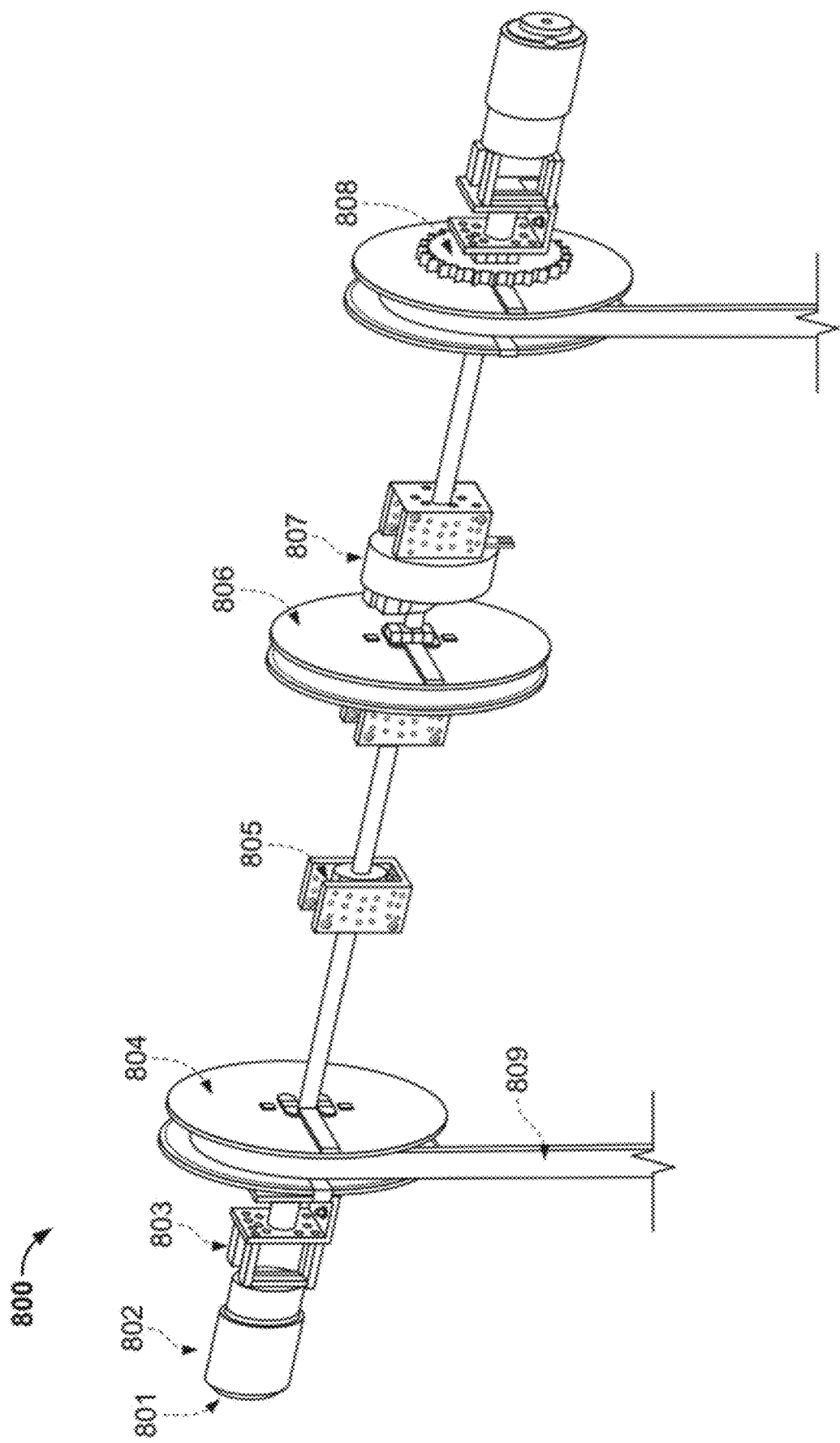
FIG. 8 shows an elevation mechanism according to an embodiment of the disclosure.

FIG. 8 shows an elevation mechanism 800 according to an embodiment of the disclosure. The elevation mechanism 800 may include a rotating bar 803 that may be mounted to the frog's internal chassis with a dc motor 802 and encoder 801 at either end of the assembly. Belts 809 reaching down to the payload bar may be spooled into two rolls 804 which may be wound around the axis of the rotating bar 803. The belts may extend down to the payload bar 702 along with a power and communication ribbon that may be spooled on the wire spool 806. The slip ring 807 may allow the bar to rotate and the wire to spool without impinging or affecting the wire connecting to the frog's brain 605. The elevation mechanism 800 may receive commands from the frog's brain 605 pertaining to the desired velocity and elevation of the payload bar 702 through actuation and control of the dc motor 802 and encoder 801, for example. The elevation mechanism 800 may perform elevation maneuvers to raise and lower the payload bar 702 under various position and velocity control algorithms. Many of the frog's functions may employ this elevation mechanism 800 and its ability to perform elevation maneuvers. The elevation mechanism 800 and payload bar 702 have limit switches mounted in order to sense when the payload bar 702 has come into contact with another surface. The elevation mechanism 800 may include a ratchet gear and pawl subsystem 808 to ensure the elevation mechanism 800 does not change its state in the event of a subsystem failure. Along the elevation mechanism there may be couplers 805 that may connect various components.

Figure 9:
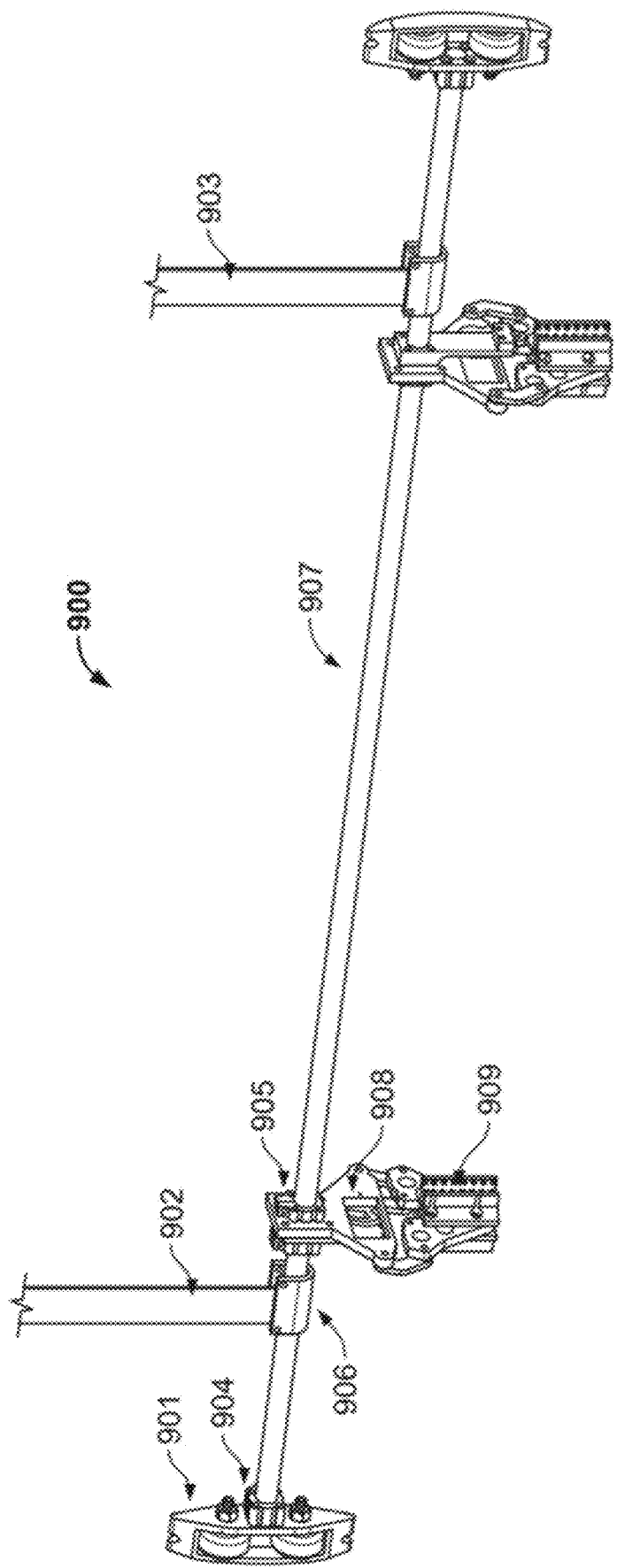
FIG. 9 shows a module acquisition system according to an embodiment of the disclosure.

FIG. 9 shows a module acquisition system 900 according to an embodiment of the disclosure. The payload bar 702 may be a hardware platform that many different subsystems may be mounted to in order to be lowered to their desired 3D positions within the facility. The example used in this instance is the module acquisition system 900. Other examples may include, but are not limited to, the following: light acquisition system, cavity cleaning system, sensor suite payload, etc. Various iterations of the payload bar 702 may include the belts from the elevation mechanism 902 and 903] and the payload bar platform 907.

In the module acquisition system 900, a group of components may collaborate to pick up, lift, lower, and release growth modules or combs. The runner 901 may be mounted to the payload bar platform by runner mount 904. Hooks 906 may be connected to the payload bar to ensure a reliable connection between the elevation mechanism and the payload bar. The module claw may be made up of the payload bar mount 905, the gripping servo 908, and the module clamps 909. The gripping servo 908 may be responsible for actuating the module clamps 909 so that the distance between the module clamps 909 decreases when making a growth module/comb connection, maintains grip during movement/relocation, then releases after the movement has been completed. One or more of these module claws 909 may be actuated to make a reliable connection to the growth module/comb.

To perform other frog 600 functions, portions of the payload bar may be replaced, and other components added. In the case of the sensor suite payload, the module claws may be removed. In the place of the module claws, other items may be installed. For example, a potential combination of the following hardware may be installed: multispectral, hyperspectral, mono-spectral, and/or IR cameras of various hardware capabilities, $CO_2$ sensors, $O_2$ sensors, humidity sensors, airflow sensors, inertial measurement unit (IMU) temp sensors, barometric sensors turbidity sensors, movement sensors, light sensors, distance sensors, lidar, power lasers, and processing, storage and communication hardware that can process, store and communicate the accumulated data to another location.

Figure 10:
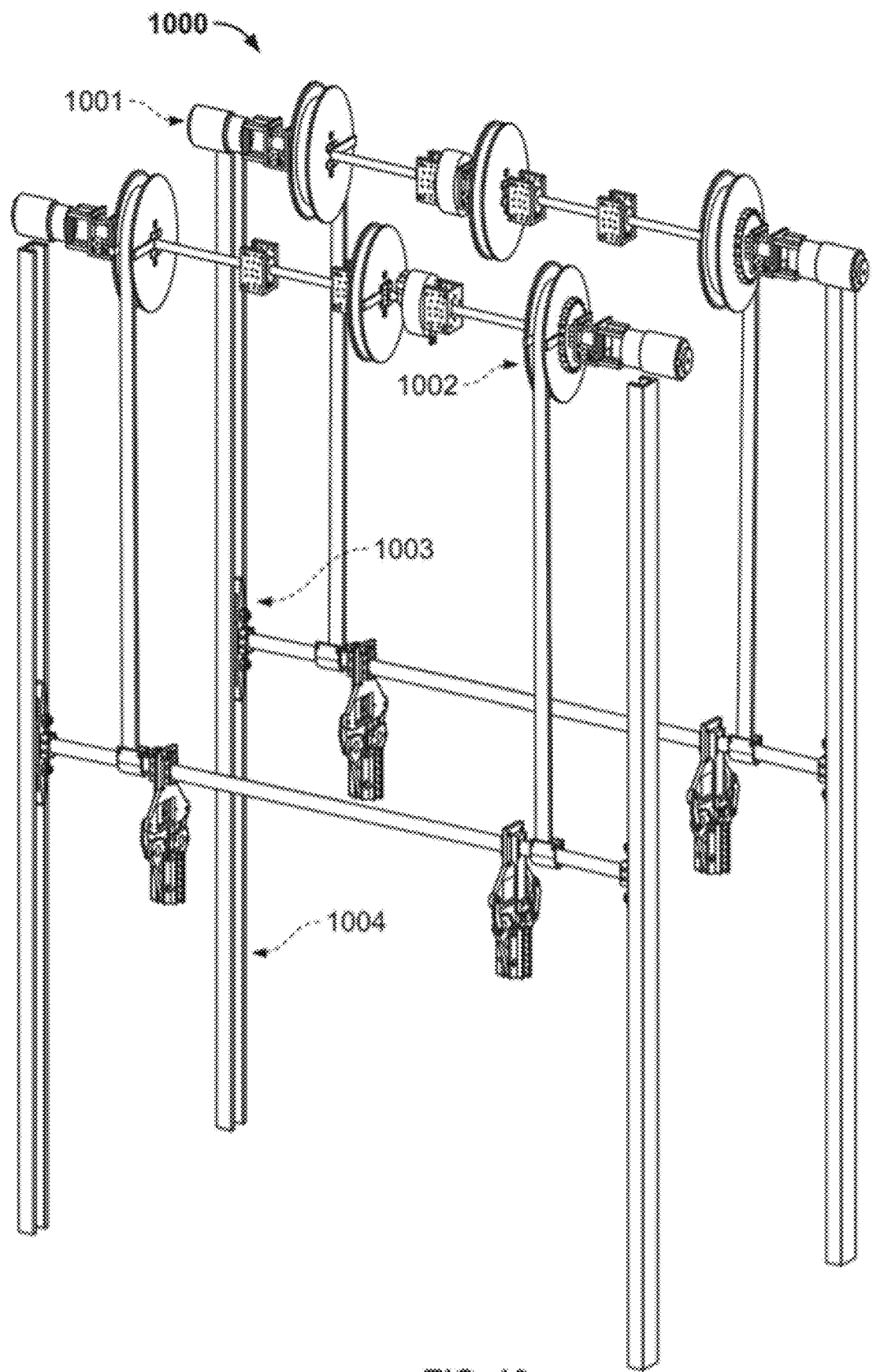
FIG. 10 shows a module acquisition system assembly according to an embodiment of the disclosure.

FIG. 10 shows a module acquisition system assembly 1000 according to an embodiment of the disclosure. Two elevation mechanisms 1001 and 1002 and two corresponding module acquisition system payloads may be situated a specific distance from one another considering the requirements of the biological entity and the growth module/comb housing the biological entity. Two sets of frog channels 1004 may be used to align the cavity's channel in the growth structure beneath the junction that the frog 600 is positioned above. The frog's channels may help to guide the growth module/comb in and out of the frog 600 and growth structure to ensure seamless acquisition and deposition of growth modules/combs. Additionally, the module acquisition system runner 901 and 1003 may be used to ensure the growth module/comb does not become disoriented while it is being acquired, stored, relocated, or deposited. The frog's channels may help to keep the growth module/comb properly oriented during the frog's movements around the facility.

Figure 11:
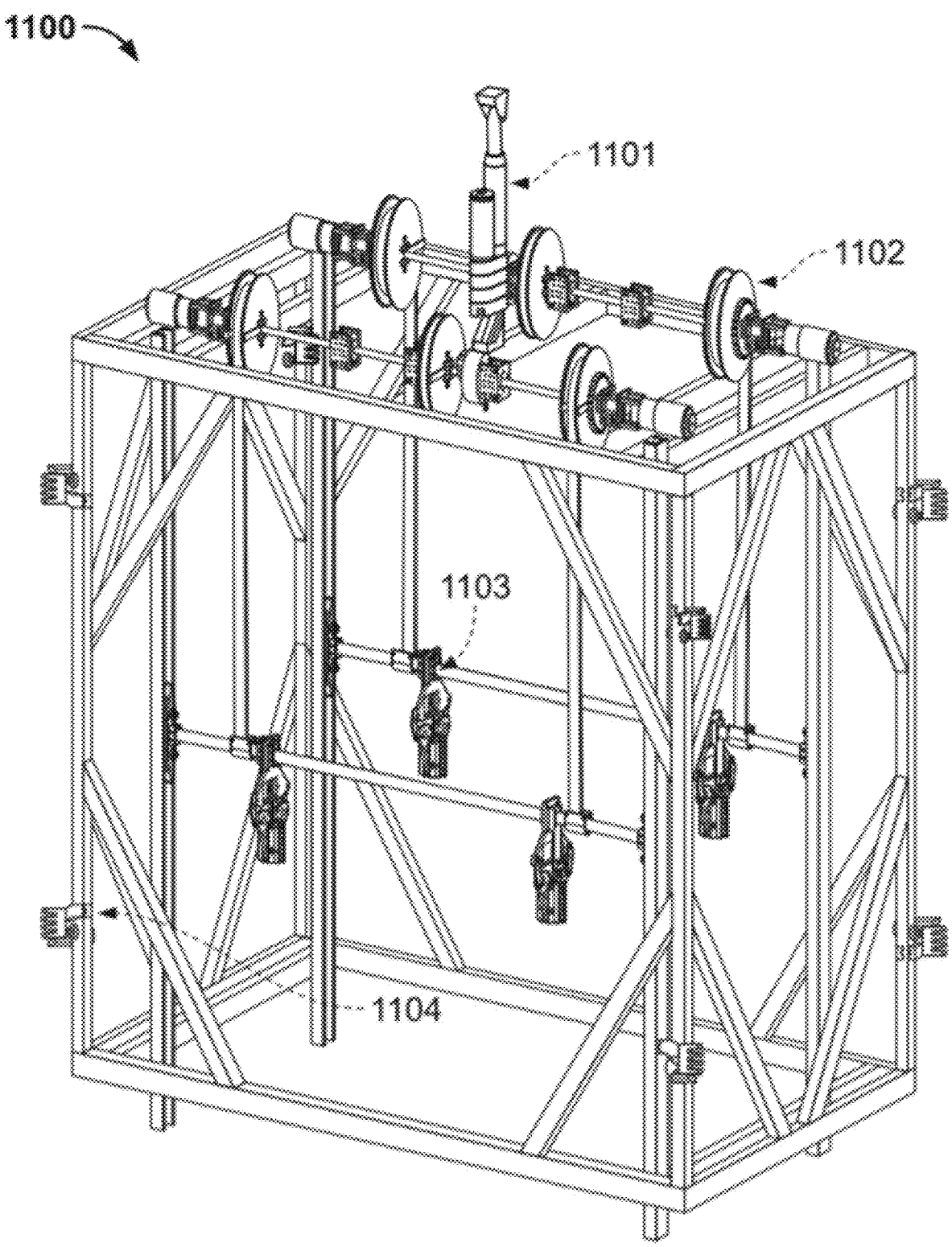
FIG. 11 shows a frog inner frame according to an embodiment of the disclosure.

FIG. 11 shows a frog inner frame 1100 according to an embodiment of the disclosure. The frog's inner frame 1100 may house the elevation mechanisms 1102, the module acquisition system payload 1103, frog's channels 1004, the frog's direction change actuator 1101, and the frog's inner and outer frame guides 1104. The frog's direction change actuator in this instance may be a linear actuator the presses the outer frame's [see FIG. 12] wheels off the ground when extending and lifts the inner frame's [see FIG. 12] wheels off the ground when retracting. Other methods of direction change may be possible using gears, transmissions, belts, chains, and/or a number of other techniques. The frog's inner and outer frame guides may ensure that the inner and outer frames remain properly spaced.

The frog's inner frame 1100 may support multiple elevation mechanisms in various locations to perform various functions. Due to the dimensions of the inner frame and junction configuration, the elevator mechanism may lower a payload bar into any portion of the growth arena [e.g., both cavities on either side, between lights and plants on either side, and between two light columns].

Various sensor suites sensing the state of the component being actuated on [plants, lights, etc.] and sensing the state of the frog 600 itself may be disposed inside the volume of the frog's inner frame 1100. Various frog configurations may have varying dimensions and junction spans. Some frogs 600 may span one junction, and/or some frogs 600 may span many junctions depending on which frog function they are assigned to perform.

Figure 12:
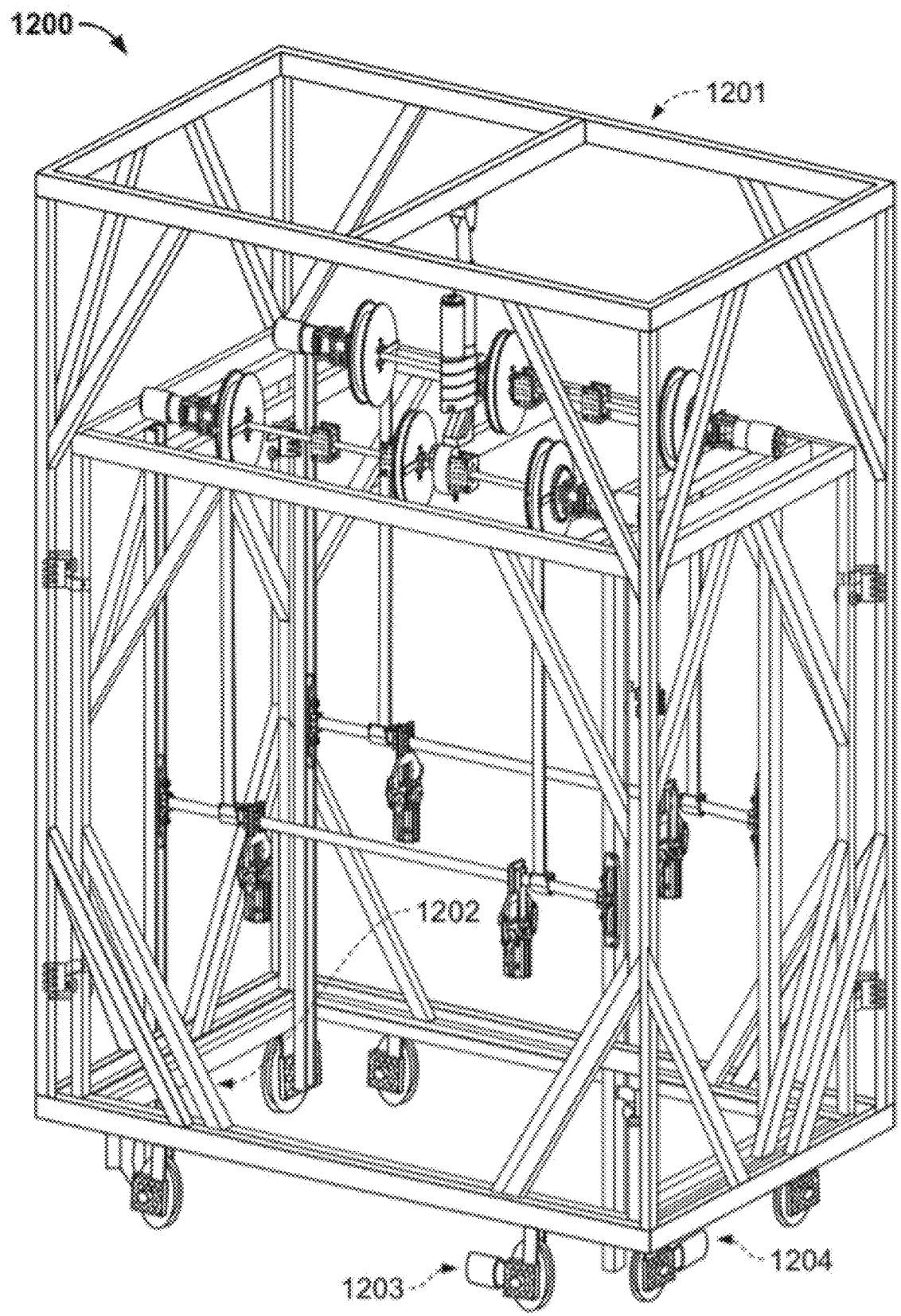
FIG. 12 shows a frog chassis according to an embodiment of the disclosure.

FIG. 12 shows a frog chassis 1200 according to an embodiment of the disclosure. The outer frame of the frog 1201 may serve a number of functions for the frog 600, such as, but not limited to, the following: mounting of frog's brain 605, of the frog's direction change actuator 1101, the frog's outer-frame movement system 1203, protective and stylistic covering of the internal contents of the frog 600, ultra-wide band tags for coarse positioning, indicator lights and screens, antennae, speakers, general lights, maintenance bays, connection points for easy movement into and out of the growth arena, and sensors to detect various environmental characteristics and plant characteristics.

The frog's outer frame 1201 may be responsible for mounting the frog's outer-frame movement system 1203 for one direction along the rails. In this instance there may be a set of four wheels 1203 mounted such that they align with the rails on the top of the growth structure. At least two of these wheels may be actuated using dc motors and encoders, with the remaining number of the wheels being passive.

The frog's inner frame 1100 may be responsible for mounting the frog's inner-frame movement system 1204 for one direction along the rails. In this instance there may be a set of four wheels 1204 mounted such that they align with the rails on the top of the growth structure. At least two of these wheels may be actuated using dc motors and encoders, with the remaining number of the wheels being passive.

In this example the frog 600 may be mounted atop the growth structure with concave wheels engaging a system of convex pipe rails. In other manifestations the wheels may be convex and the rails concave in profile; the frog 600 may be suspended from a structure connected to the roof; the frog 600 may be mounted atop a substructure that connects to the roof or the growth structure. In any case, this disclosure may include any single-robot or multi-robot system that operates above the growth of a biological entity in a vertical farm. A single frog 600 may be responsible for all of the subsequent tasks listed hereunder. However, in many circumstances, a group of frogs with varying hardware may perform separate tasks within the farm.

Figure 13:
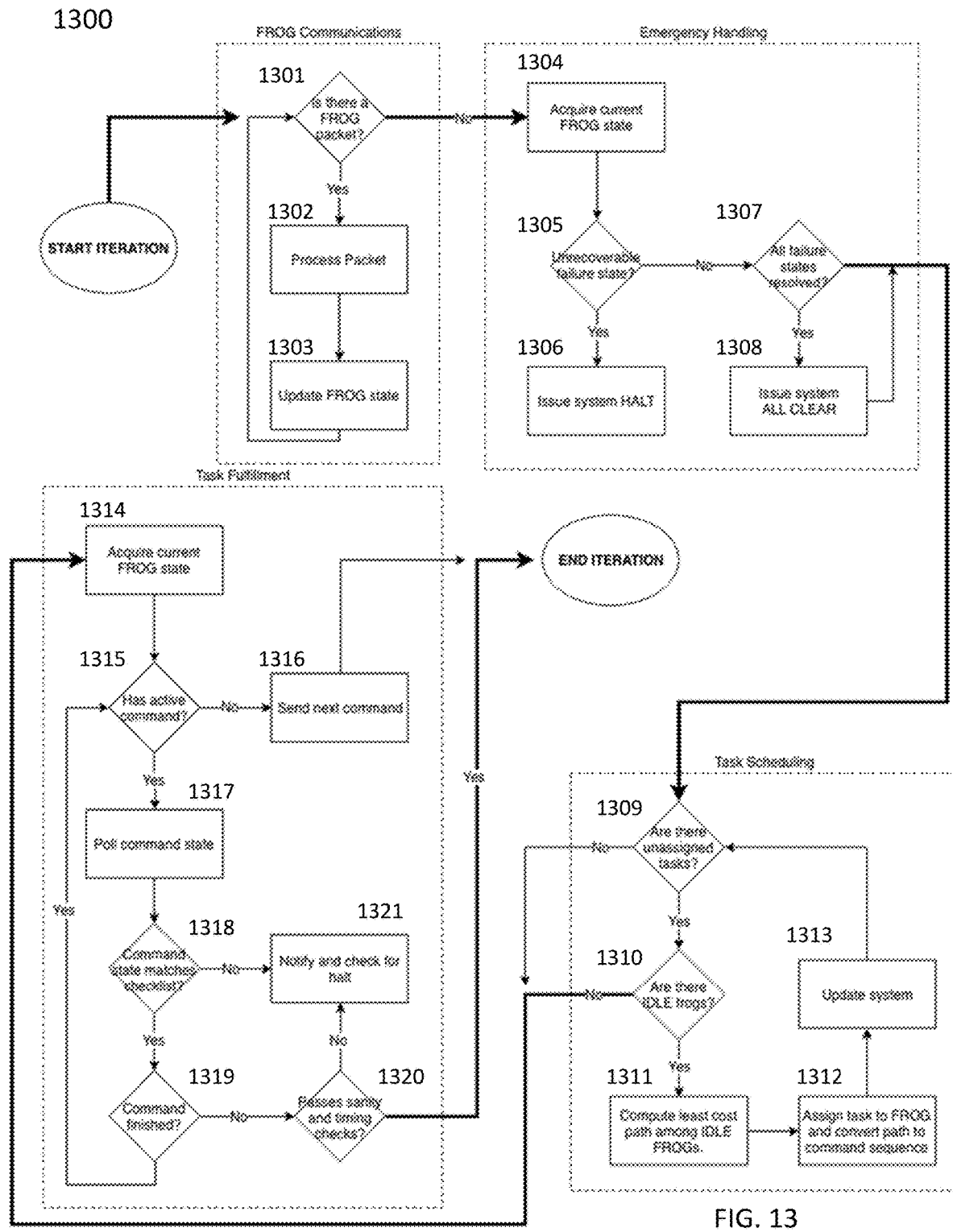
FIG. 13 shows a frog function process according to an embodiment of the disclosure.

FIG. 13 shows a frog function process 1300 according to an embodiment of the disclosure. Process 1300 may be an iteration of the frog's high-level software loop. At the beginning of the iteration, the frog may check for packets 1301 coming from ground controller containing instructions or general information. After the packet has been processed 1302 and the frog's state updated 1303, the frog may enter a loop to ascertain whether all of the failure checks on-board the frog have been passed.

The loop may include acquiring a current frog status 1304, determining whether an unrecoverable failure state exists 1305 and, if so, halting the processing 1306. If no failure exists and/or if all failure states are resolved 1307, the frog may issue a system all clear 1308.

Once a frog is cleared for its next task, the task may be assigned. A scheduling algorithm may determine whether there are unassigned tasks 1309 and, if so, may identify any idle frogs 1310. The task may be assigned to the frog 600 with the hardware capacity and availability to execute the task in question. For example, processing paths for identified idle frogs 600 may be computed 1311, and the available frog with the lowest-cost path may be assigned to complete the task 1312, at which point that frog may generate a sequence of commands to execute using the various actuators on-board. The system may be updated 1313.

At this point, the frog 600 may go into a loop that constantly monitors the performance of the task execution against the expected timing and sequencing required for that specific movement. For example, frog brain 605 may acquire the current frog state 1314 and determine whether a command is active 1316. If not, the frog 600 may be reported as idle and may receive a next command 1316. If the frog 600 has a current command active, a command state may be polled 1317 and evaluated to determine whether it matches a checklist 1318. If so, the frog brain 605 may determine whether the command is finished 1319 and, if so, may loop back to 1315. If the command is not finished, frog 600 may be evaluated to determine whether response and timing are expected 1320 and, if so, may be reported as idle. If checks fail at 1317 or 1320, a failure may be reported and frog brain 605 may monitor for a halt command 1321.

Upon completion of the task at hand, the frog 600 may check for subsequent commands from ground controller or the network of frogs 600 on duty. This loop may be versatile and fault-tolerant and may allow the frog 600 to receive emergency directives from ground controller or other frogs 600 as an emergency interrupt in-case of a system failure.

The following is a non-exhaustive list of examples pertaining to the task scheduling loop in the iteration. These examples give a feel of the task scheduling and execution that occurs on the frog 600 during its operation. Included in these examples are a light movement/acquisition sequence, data acquisition/sensor deployment sequence, column cleaning/sanitization sequence, recharge/data-upload sequence, and a facility construction sequence. All are high level examples that exemplify the versatility of the frog 600 in the vertical farming setting.

The light movement/replacement sequence may proceed as follows. Within the growth arena, adjacent to the growth modules/combs situated in the column, a light column 301 may hang from pallet support beams mounted on the growth structure as noted above. A support-frame suspended from the load beam may drape one or more belts/cabes/fibers/straps downward to the bottom of the column as noted above. The lights may be connected to the straps to orient the lights in such a way that efficiently, sufficiently, and optimally illuminates the biological entity. It may be useful to actively vary the distance of the lights from the plants since the ratio of light emission to plant absorption may improve as the lights get closer, assuming the LED lights are distributed enough to maintain ample coverage over the canopy.

The frog 600 may localize itself on top of a junction that sits above the desired light column. The frog 600, utilizing a similar mechanism to the elevation mechanism [though they could potentially be the same mechanism] called the light acquisition mechanism, may reach down to the connection point on the light column. The frog 600 may lift the light column up from its seat on the load beam. In the case where the frog 600 is adjusting the light-to-plant distance, the frog 600 may translate such that the lights either move farther away or closer to the growth modules/combs. Once the frog 600 has performed its plant-relocation directive, the frog 600 may lower the light column's frame back onto the seat of the load beam and may query ground controller for a new directive using process 1300.

In the case of light acquisition, the frog 600 may reach down to the connection point on the light column and may pick the frame supporting the light column up and away from the load beams. The light acquisition system may begin to spool up the light column into a roll; other stacking or folding mechanisms may be implemented to achieve the same goal. Blind-mate connectors up the top or bottom of the growth structure may allow the light columns to be actively removed and replaced without manual disconnect.

The data acquisition and sensor deployment sequence may proceed as follows. A variant of the frog 600 may have the capacity to house and deploy the sensor suite payload. Portions of the sensor suite may be attached to the chassis of the frog 600, but many of the sensors may be mounted to the sensor suite payload. This sensor suite payload, with a similar or identical elevation mechanism that the module acquisition system payload employs, may have the capability of transducing any and all plant characteristics, environmental characteristics, and various other states of the system. The data may be sent back to the frog's brain 605 for both storage and transmission to other electronic hardware within and eventually outside of the facility, according to process 1300 with data acquisition as the frog task.

The column cleaning, sanitization, and testing sequence may proceed as follows. The frog 600 may have the capability to clean the interior of the cavity of the column. To clean the column, a varying collection of UV lights, bristles, sprays, sensors, and swabs (the "cavity cleaning system") may attach to the payload bar. In this circumstance, the combs sitting in the column may be removed for relocation before the cleaning cycle is begun. Once emptied, the cavity cleaning bar may be lowered down using the elevation mechanism. Throughout this process the UV lights, oriented in such a way that every surface of the column is illuminated by the UV light, may blast the column to kill unwanted biological matter. The cavity cleaning system may brush, spray, and swab any portion of the column as part of a collection of components that clean and sanitize the surfaces and orifices within the column, including the rails that guide the combs. The sensors on the cavity cleaning system may accumulate data on plant characteristics and environmental characteristics to transduce the state of the column's structures and surfaces. These functions may be provided as frog task(s) under process 1300. At the end of the cleaning process, the cavity cleaning system may deliver the data back to the frog's brain 605 for further transmission to other electronic hardware within and/or outside of the facility. Physical data (for example the swabs from the cavity) may be deposited in a location that may be accessed by humans and/or automated machines.

The recharge and data upload station sequence may proceed as follows. A recharge station may be situated on the periphery of the frog's track system. There may be one or many recharge stations depending on the size of the facility, number of frogs, variety of frogs, etc. The recharge station may provide a place where the frog 600 can auto-recharge and form a hard-wire connection to a data upload link. In this instance, the frog 600 may translate over to the recharge station under the command of ground controller or the frog's brain 605 and according to process 1300 for in a variety of circumstances, including, but not limited to, the following: low-battery, data-storage is full, all tasks are complete, etc. In this instance the frog 600 may align itself with the recharge mechanism that may use induction charging or some other method to recharge the batteries on-board the frog 600. The hard-wire data upload link may include a set of connectors and contacts that may allow the frog 600 to communicate large amounts of data at a high transfer rate. A variety of information may be transmitted, including but not limited to the following: historical telemetry data, sensor data, health status, etc.

The facility construction sequence may proceed as follows. In some cases, the frog 600 may be responsible for the construction/deconstruction of the facility before, during, and/or after operation. The structures of the farm may be designed such that the frog 600 may be responsible for the construction and deconstruction of certain elements of the facility. For example, after the growth structure is constructed (e.g., the structural members that support the cavities, wrapping, lights, fluidics, etc.; and the rails that the frog translates upon in addition to other subsystems), the frog 600 may install, construct, and/or deconstruct the following subsystems: light columns, columns, fluidics subsystems, HVAC subsystems, etc. For example, the construction and deconstruction of the column may pertain to the placement and removal of sections/components of the column's cavity and comb guide-rails 302 and 304. The installation and removal of the fluidics subsystems may pertain to the piping, hosing, junctions, connectors, and nozzles that may be responsible for receiving the fluid and delivering it to the roots within the column's cavity. The frog's responsibility to install, relocate and remove HVAC subsystems from the growth arena may include the frog 600 connecting to various HVAC hardware [ducting, junctions, baffles, VAV boxes, supports, etc.] and spooling, folding, stacking the subcomponents such that they can be confined within the internal volume of the frog, etc.

Figure 14:
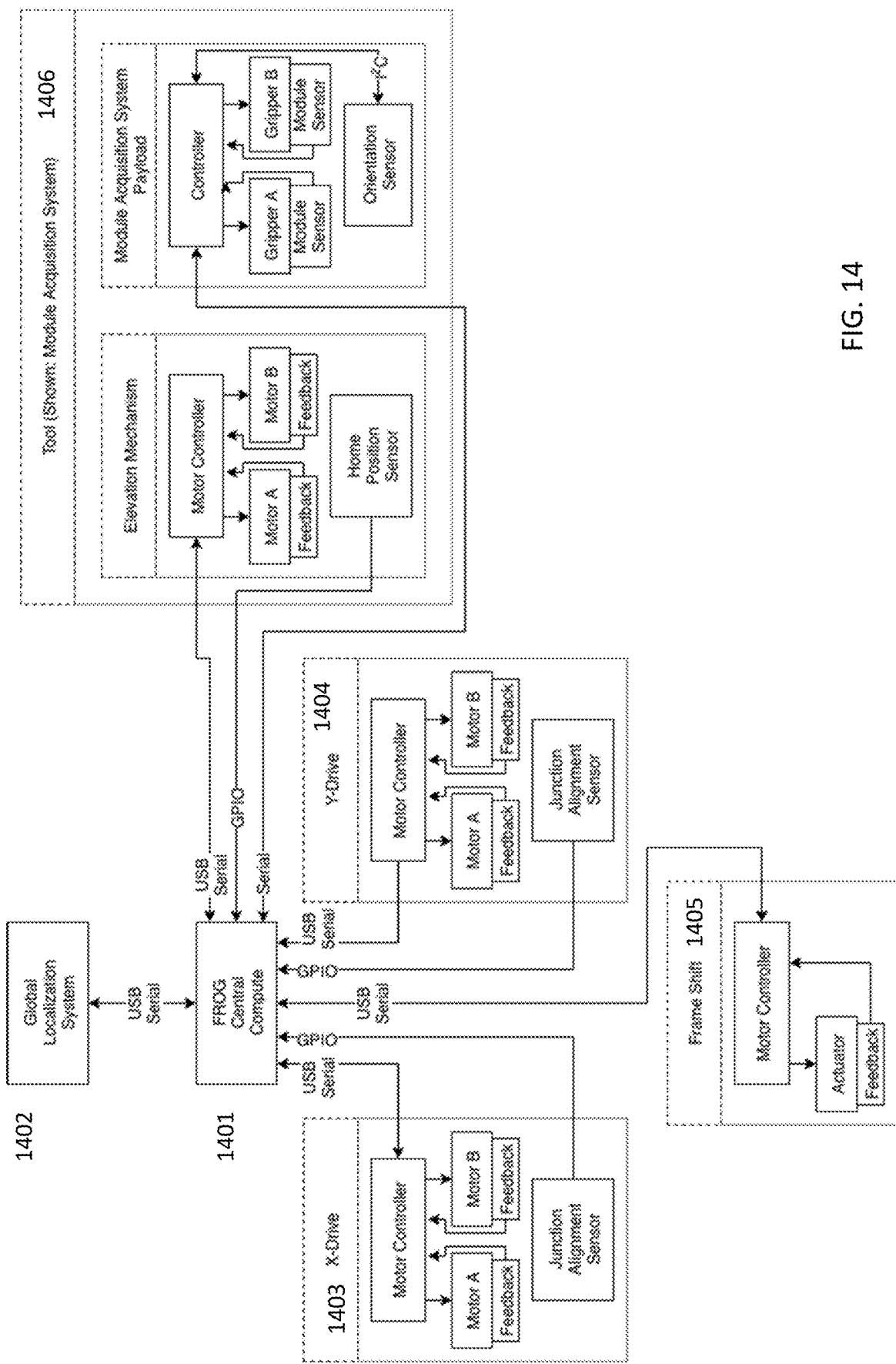
FIG. 14 shows a set of frog components according to an embodiment of the disclosure.

FIG. 14 shows a block diagram of frog components according to an embodiment of the disclosure. This diagram outlines major subsystems, their components, and the communication channels between them. The global localization system 1402 may be the coarse positioning system outlined above. The frog central compute 1401 may be a piece of electronic hardware capable of all described inputs and processing all data coming into, out of, and within the frog itself (e.g., functioning as the frog brain 605). An example of this processor may be a Raspberry Pi 3 b+, among many other capable electronic hardware. The tool 1406 may be the combination of elements being manipulated by the frog 600 such as, in this example, the elevation mechanism and the module acquisition system payload. The module acquisition system payload may include an orientation sensor [or IMU] on-board that may inform the frog about the state of the payload bar during its performance of the directives. If the payload bar is not at the desired orientation, it may be likely that a failure has occurred, so the frog may enter failure mode and analyzes the root of the problem and decides the optimal next steps as described above. The x-drive 1403 and y-drive 1404 may drive the wheel assemblies that actuate the frog along the "x" and "y" planes on top of the growth structure as described above. Frog central compute 1401 may send directives to the x-drive 1403 and y-drive 1404 in the form of USB serial, for example, for the motor driver to convert into signals that may be sent to each motor and/or to have the encoder data returned for closed-loop control. The frame shift 1405 may include the direction change actuator that controls the direction of actuation along the rail system as described above. Frog central compute 1401 may have the capacity to add more components to add capabilities in order to achieve various frog functions.

Figure 15:
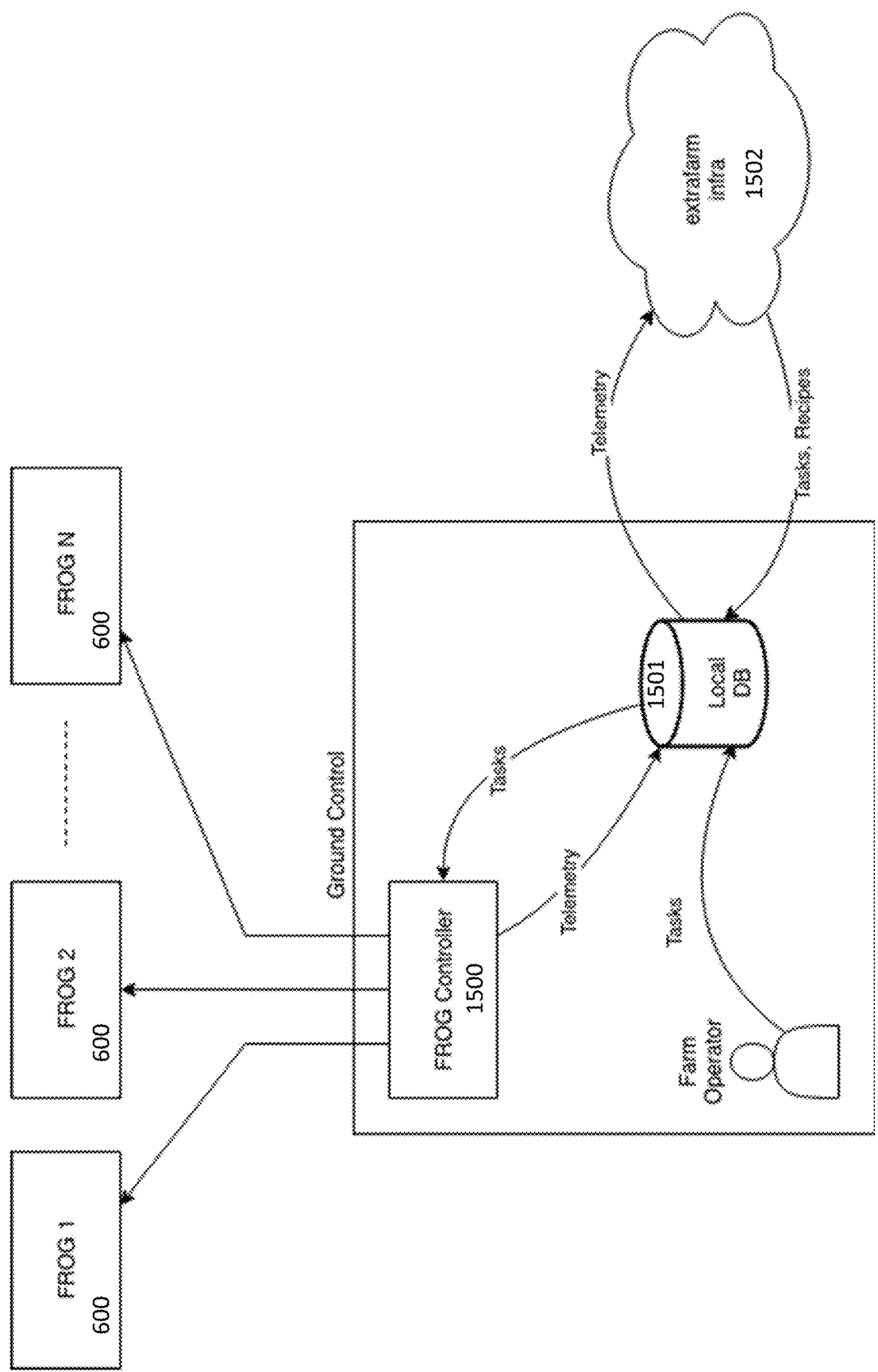
FIG. 15 shows an external controller according to an embodiment of the disclosure.

FIG. 15 shows an external controller 1500 according to an embodiment of the disclosure. The external controller 1500 may provide a wider system that the frog 600 may interact with and that may aid in the construction and delivery of directives based upon a plethora of other data sources. The cloud-based software architecture 1502 may communicate with computational devices local to the facility, such as local DB 1501 and/or controller 1500. The local DB 1501 may take information from the cloud-based software architecture 1502 and, potentially, input from the operator on-site at the facility, then may send directives to the frog controller 1500. The frog controller 1500 may use this information to decide which frog 600 to send the lower-level, action-based directives to the optimal frog for that scenario, as described above.

Figure 16:
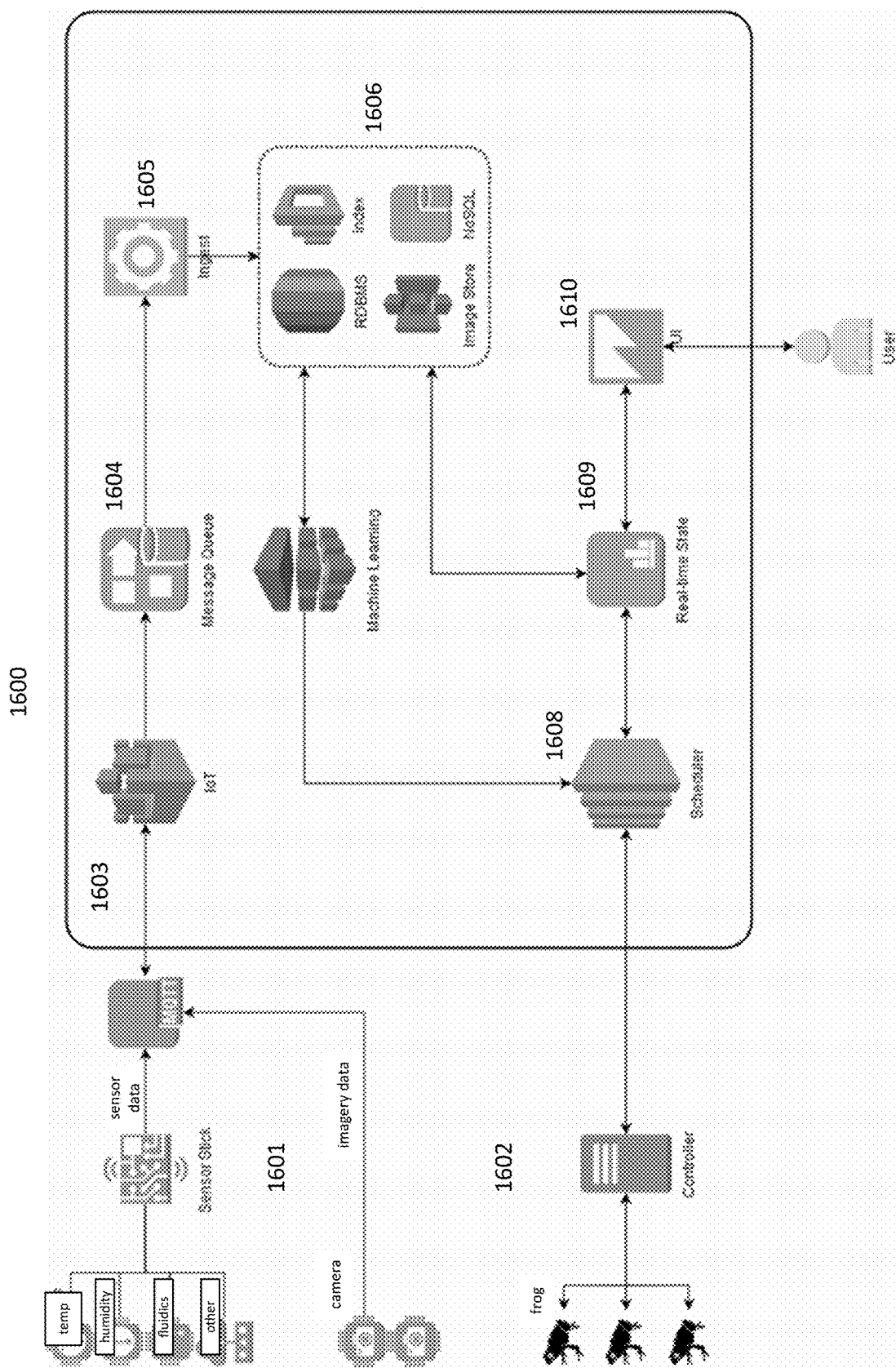
FIG. 16 shows a control system according to an embodiment of the disclosure.

FIG. 16 shows a control system according to an embodiment of the disclosure, illustrating a logical arrangement among software elements within controller 1500, local DB 1501, and/or cloud-based software architecture 1502.

Data from the facility 1601 may flow in through the ground controller 1603 to the cloud-based software architecture. This data may pass through a filtering and queuing engine 1604 before it is ingested 1605 into various cloud-based services 1606. These services 1606 may store the data in a number of different locations and forms for it to be retrieved through various querying methods. The cloud-based software architecture may also include plant recipes 1607 which may be continuously optimized and/or iterated upon using machine learning, artificial intelligence, etc. Plant recipes 1607 may dictate the performance of the subsystems within the facility. Comparing the real-time state of the facility to the plant recipe requirements may yield a difference. This difference may be actively minimized through actuation of the various subsystems 1602 on the ground, such as frog(s), lighting, nutrients, HVAC, etc. Plant characteristics that manifest in the various sensed environmental characteristics may be recorded, queried, and compared against the desired plant characteristics. Variations in outcome may be recorded, and algorithms may be executed on those differences to further understand the plant's response to the environmental characteristics and improve the performance of the growth system.

The cloud-based scheduler 1608 may be responsible for taking the current state of the facility and directives coming from the cloud-infrastructure to dictate the performance of the actuators within the growth arena. Copies 1609 of this schedule may be brought down from the cloud-based software architecture 1606 such that any disconnection from the internet may not result in the malfunction of the system. The controller 1602 that is on-site within the facility may be responsible for turning those high-level directives into actuator state changes. With the number of variables and the complexity of the interactions between many of these variables, the cloud-based scheduler 1608 may be a sophisticated optimization algorithm that manages the performance of the facility. Some embodiments may include a user interface 1610 allowing users to monitor and/or provide input into any of the aforementioned, otherwise automated, systems.

System data stored in cloud-based services 1606 and/or used elsewhere within the architecture may be represented as a set of objects in the system's computer knowledge base. The objects may represent any types of objects, both physical and conceptual, in the system. The objects may be linked to indicate various relations between the objects.

The "recipes" for growing plants may be objects, and the complete representation of biological entities (plants) in the indoor farm may be one or more objects. This may be in addition to representing the traditional physical objects in the farm and facilities. This may allow the systems, as described elsewhere herein, to compare the expected state of the biological entity (the plant's recipe) with the actual state of the plants as perceived from the sensor data. Objects may include information for each plant grown on the farm; recipes about how to grow each type of plant or species on the indoor farm; physical objects in the farm; and/or characteristics of the market in which the system is operating.

Some objects may be classified as essential objects. Examples may include lights, nutrient system components, HVAC, etc. Plants may be their own unique subclass of essential objects.

Some objects may be classified as structures. Examples may include component units of the indoor farm such as walls, cavities, etc.

Some objects may be classified as equipment, such as frogs, pucks, combs, etc.

Some objects may be classified as facilities, which may represent information about a physical indoor farm or growth area. Each separate indoor farm may be represented as a different object.

Some objects may be classified as variable history. Objects representing information about the history or time phased summary of an object may be examples of variable histories.

Some objects may be classified as recipes.

The system may also define relationships between objects. There may be various types of relationships.

One example relationship may be a binary association. This link may represent a one-to-one relationship between two objects. This may indicate a physical relationship, such as each germination module having a germination sensor. It may also represent a symbolic association, for example, each plant may have a unique plant variable history associated with it.

One example relationship may be a class extension. This link may represent the relationship between a primary component and sub-components or specialized components of that object. For example, different types of liquid and nutrient tanks may be class extensions of the "tank" class.

One example relationship may be a dependency. Some objects may be results of "parent" objects. This may be used for sensor data, for example. Data collect objects (e.g., an image or sensor reading) may be "dependent" upon the sensor (e.g., imaging system) that collects that data.

One example relationship may be an aggregation. These may be one-to-many relationships where objects may be grouped into another object. For example, plants may be aggregated into a growth module. Plants may also be aggregated or organizationally grouped into a species.

One example relationship may be a composition. This may represent objects that are components of another object. For example, the plant science lab may be "composed" of (among other objects), an HVAC, germination unit, and PSL growth unit.

Some specific examples of information that may be related to other information in this fashion may include, but are not limited to, the following.

Each plant grown in the indoor farm may be represented as a separate object. Each plant object may contain basic plant information such as key dates in plant's life such as planted (birth), germinated, transitions, harvested (death), etc. Each plant may be linked to information about that plant. This may include the plant's species, the plant's recipe, plant's physical location in the farm, the state of the plant at every stage of its life cycle (e.g., which may include sensor data as well as a representation of information about the plant that has been extracted from the data and interpreted), and/or harvest information about when and how the plant was harvested.

Each recipe used in the indoor farm may be represented as a separate object. A recipe may include a semantic representation of how a plant should be grown. The recipe may predict through representational links the features a plant may exhibit through its lifecycle as well as the expected outputs of the plant upon harvest. In this process, the recipes may be used by system algorithms to compare expected plant characteristics to observed characteristics collected from the sensors, as noted above. Specific representations may include, but are not limited to, Recipe ID (e.g., name, plant species/subspecies); the plant's growth plan that indicates how the plant should be grown and represents the actions taken on the plant; the type of lighting (e.g., frequency spectrum, color) applied to the plant, when lighting was applied to the plant, the intensity of the lighting applied to the plant, and/or other details (e.g., distance from plant, angle, etc.); what nutrients are used to grow the plant and/or how often (frequency) and in what amounts were they applied; temperatures of plant environment; etc. Each recipe may have relationships to plants grown with this recipe and/or species for which the recipe is derived.

Each facility may be represented as a separate object. Each facility may be linked to its major equipment and components within the farm. Also represented with each facility may be information about the name of the farm, its physical location, the date it was put in service, its size (e.g., number of pods), etc.

The representations and links may enable the system to determine information such as crops grown, types of crops grown over time, recipes used, farm (location) results, harvests, harvest results (e.g., output of various crops), quality outcome, revenue outcome, notes or anomalies/ information to remember, other farm information, cost of operations, maintenance records, key personnel, notes or anomalies about farm, etc.

Each piece of structure, equipment, and/or essential object in the indoor farm may be represented as a separate object. These representations may be classes for the physical inert objects found within the indoor farm and facilities. Structures may be larger farm components, such as the germination unit or a pod, as described below. Structures may be composed of other structures, equipment, or essential objects. Equipment and essential objects may represent physical components. Essential objects may represent equipment for which there is a dynamic history that may be represented. For example, an essential object may be an HVAC unit. As the HVAC unit operates, a variable history object (HVAC variables history) may be associated with the HVAC to record information about its performance and operating history. Physical equipment that does not require the representation of dynamic information, such as a filter or several sensors, may be called equipment, not an essential object. Structures, equipment, and essential objects may be linked through various one-to-one and one-to-many relationships as appropriate.

Variable history objects may be inherited classes of information that may be attached to another object representation in the system. These representations may include time linked information about their attached object. The variable history representation may be used for all types of both physical and conceptual representations in the system that may require the system to collect data about or store information at different points in time. For example, this can include collected information about the biological entities (plants) in the system and/or information about physical objects such as a growth module.

Figure 17:
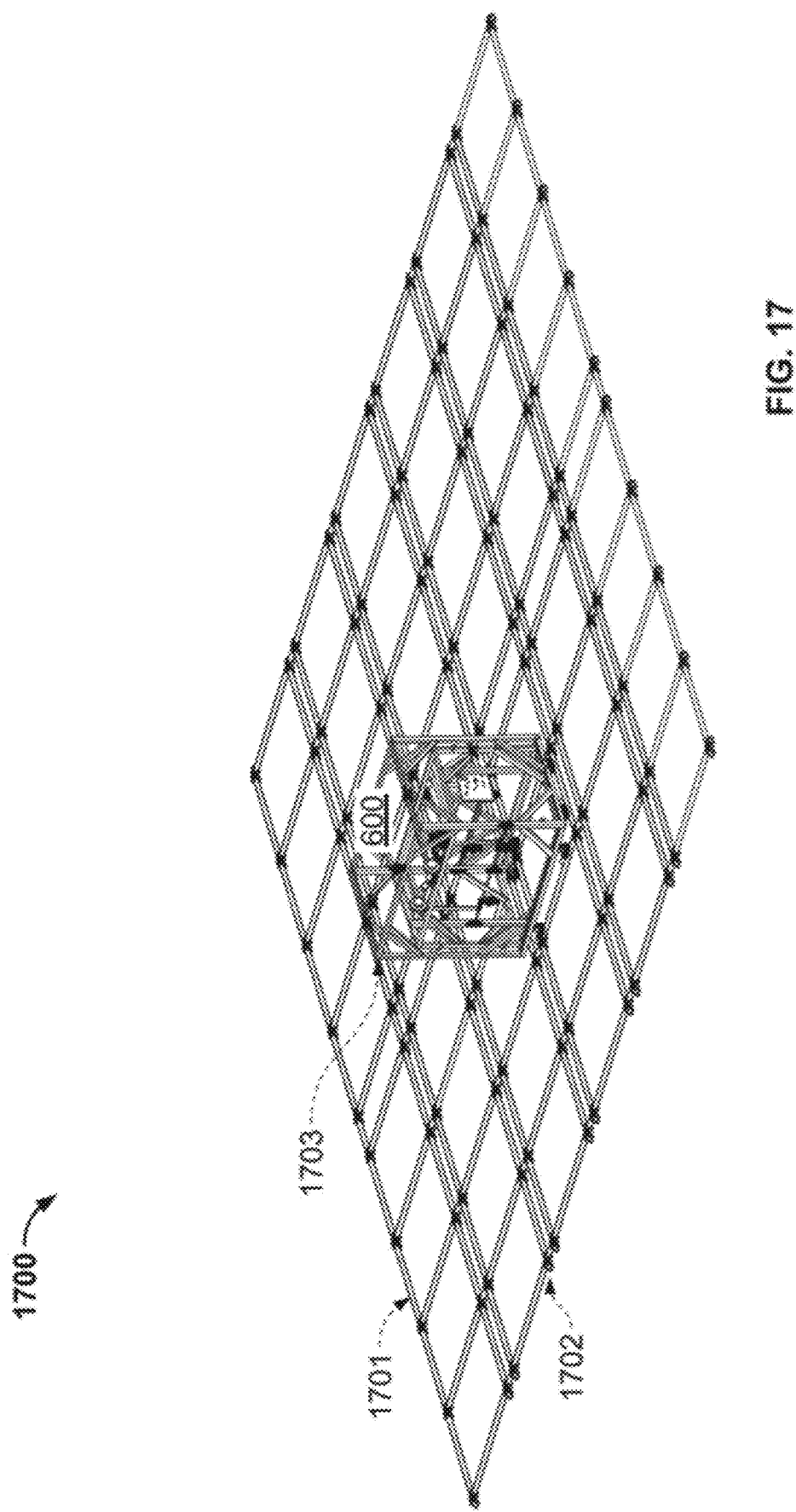
FIG. 17 shows a rail structure according to an embodiment of the disclosure.

FIG. 17 shows a rail structure 1700 according to an embodiment of the disclosure. In some embodiments, the rail structure 1700 may be made of ½ inch schedule 80 PVC pipe 1701 connected to 4-way PVC connectors 1702. In other embodiments, other rail objects may be used to form structure 1700. The rail structure 1700 may mount to the top of the load beams in the growth structure and may support one or more frogs 600. A plurality of junctions may sit above a plurality of columns mounted to and hanging from the load beams. The alleyway 1703 may be a portion of the growth structure which allows the frog 600 to pass between rows of pods. This alleyway 1703 may be built into the growth structure at some interval along the row of pods, for example: three 24 ft uprights separating the rows of pods, then an 18 ft upright to allow the frog to pass between rows of pods.

The rail structure 1700 may be mounted on top of the entire growth structure. This may give the frogs 600 access to the entire growth arena and to the peripheral subsystems. As mentioned before, the rail structure 1700 may be mounted to the roof or mounted to another substructure above the growth structure and may have a convex or concave profile or a flat surface for the robots to translate on top of.

Figure 18:
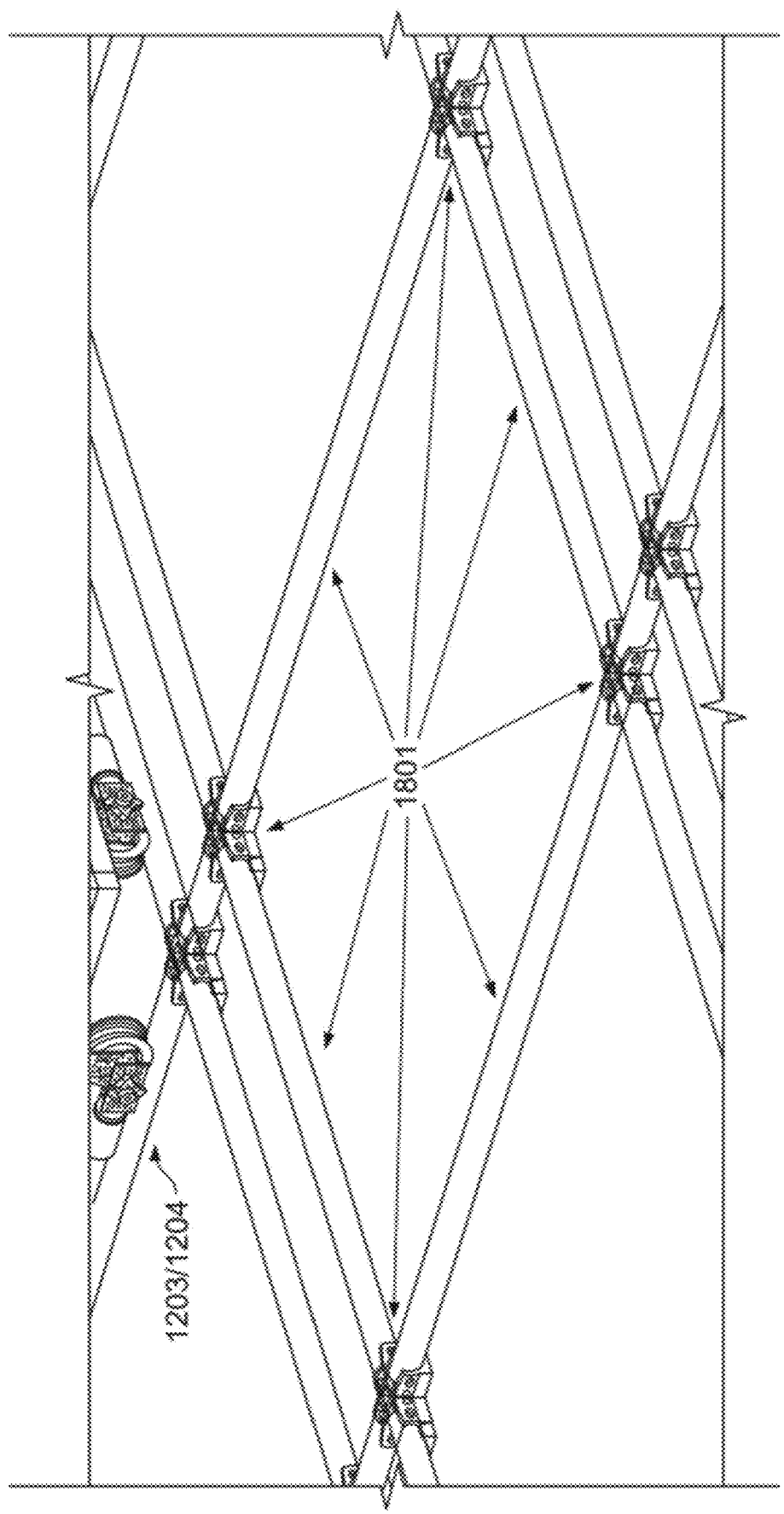
FIG. 18 shows a rail structure junction according to an embodiment of the disclosure.

FIG. 18 shows a rail structure junction according to an embodiment of the disclosure. The rail structure 1700 may include many repeatable units called junctions 1801. These junctions 1801 may be mounted to the top of the load beams that may be mounted to the uprights which may be bolted to the floor. These junctions 1801 may be situated centrally above the light columns that illuminate the growth modules/combs. With the shorter member of the junction 1801 mounted to the load beam and the longer member of the junction 1801 mounted to the pallet support beams, the frog 600 may have full access to all of the components beneath it. In this instance, the long-member rail may be mounted to the top of the cavity. The fluidics system may be mounted to the same pallet support beam that the long-member rail is mounted to. In other instances, the rail may be mounted to the light column pallet support beam. With the volume and dimensions of the frog 600 varying with the function each frog 600 is built to perform, the frog 600 may always configure itself around the size and location of the junction implemented in that facility. Under some circumstance, junctions 1801 may be of varying dimensions to accommodate various subsystems.

Figure 19:
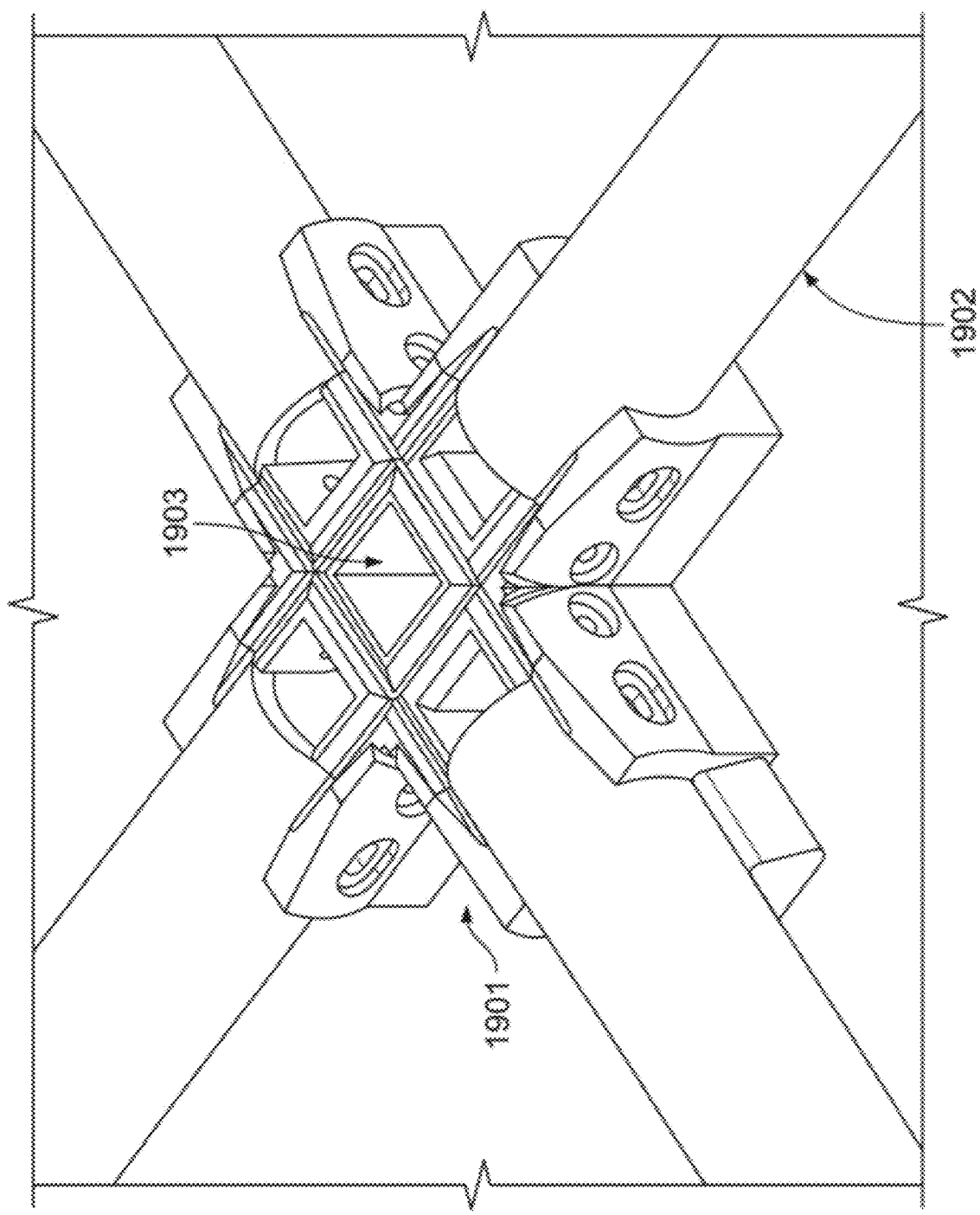
FIG. 19 shows a connector according to an embodiment of the disclosure.

FIG. 19 shows a connector according to an embodiment of the disclosure. The connector 1902 may act as the connecting point between pipes (e.g., 1701) making up some portion of the rail structure. In this example, the connector 1902 is a four-way PVC connector linking four PVC pipes, though other embodiments may have different arrangements. The junction may be designed in such a way that the convex wheels of the frog 600 may seamlessly transition from the PVC rail 1901 to the 4-way PVC connector 1902 and back to the PVC rail 1901. The cutout 1903 may provide not only a potential mounting point of the rail structure to the load beam, but also something that the frog 600 may utilize for fine localization. This cutout 1903 may be empty, with the frog 600 being able to identify it using various methods, or the cutout 1903 may have an indicator of some kind that may alert the frog 600 that it has reached the correct location above junction.

Figure 20:
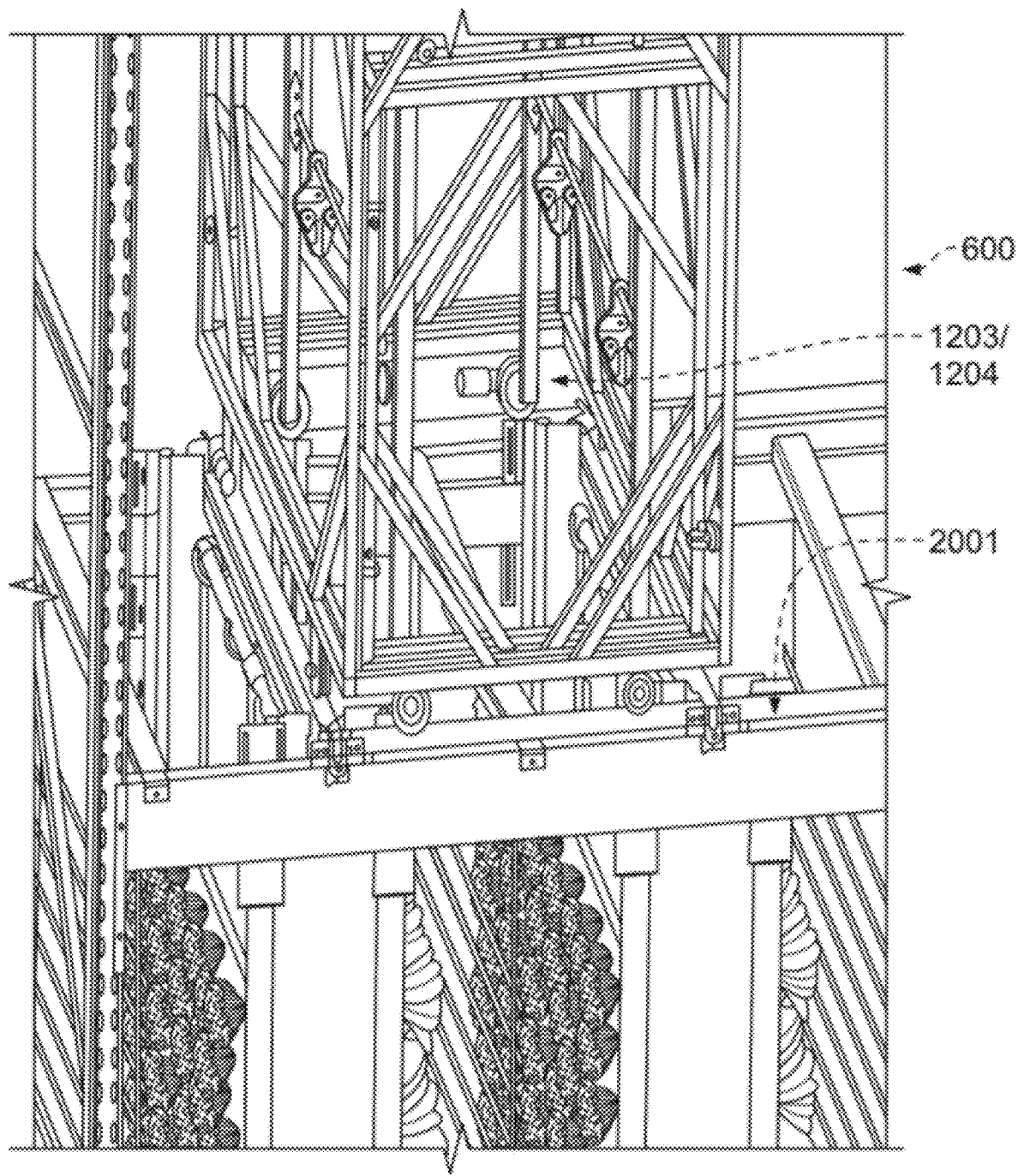
FIG. 20 shows a frog and junction according to an embodiment of the disclosure.

FIG. 20 shows a frog 600 and junction 2001 according to an embodiment of the disclosure. The frog 600 may properly align itself over a junction 2001. The frog 600 may the inner/outer frame such that all wheels 1203/1204 are level and planted on the desired junction 2001. The frog 600 channels may now be aligned with the column channels in order of the frog 600 to perform a task (e.g., a module acquisition). In this case, the light column is bi-directional with both led strips [illumination both adjacent columns], though, in other cases, the light columns may be split into two, with two separate pallet support beams so that the frog 600 can perform light movement and light removal/replacement.

Once the module acquisition has been performed, the frog 600 may either elevate or lower the outer frame to travel to its next predetermined location. This combination of columns, junctions, light columns, and growth modules may repeat throughout the growth arena, with the frog 600 having the capacity to locate any component within the facility. Every component within the facility may have its location known in the database, so the frog 600 may understand exactly which junction it must relocate to in order to access a target component.

Figure 21:
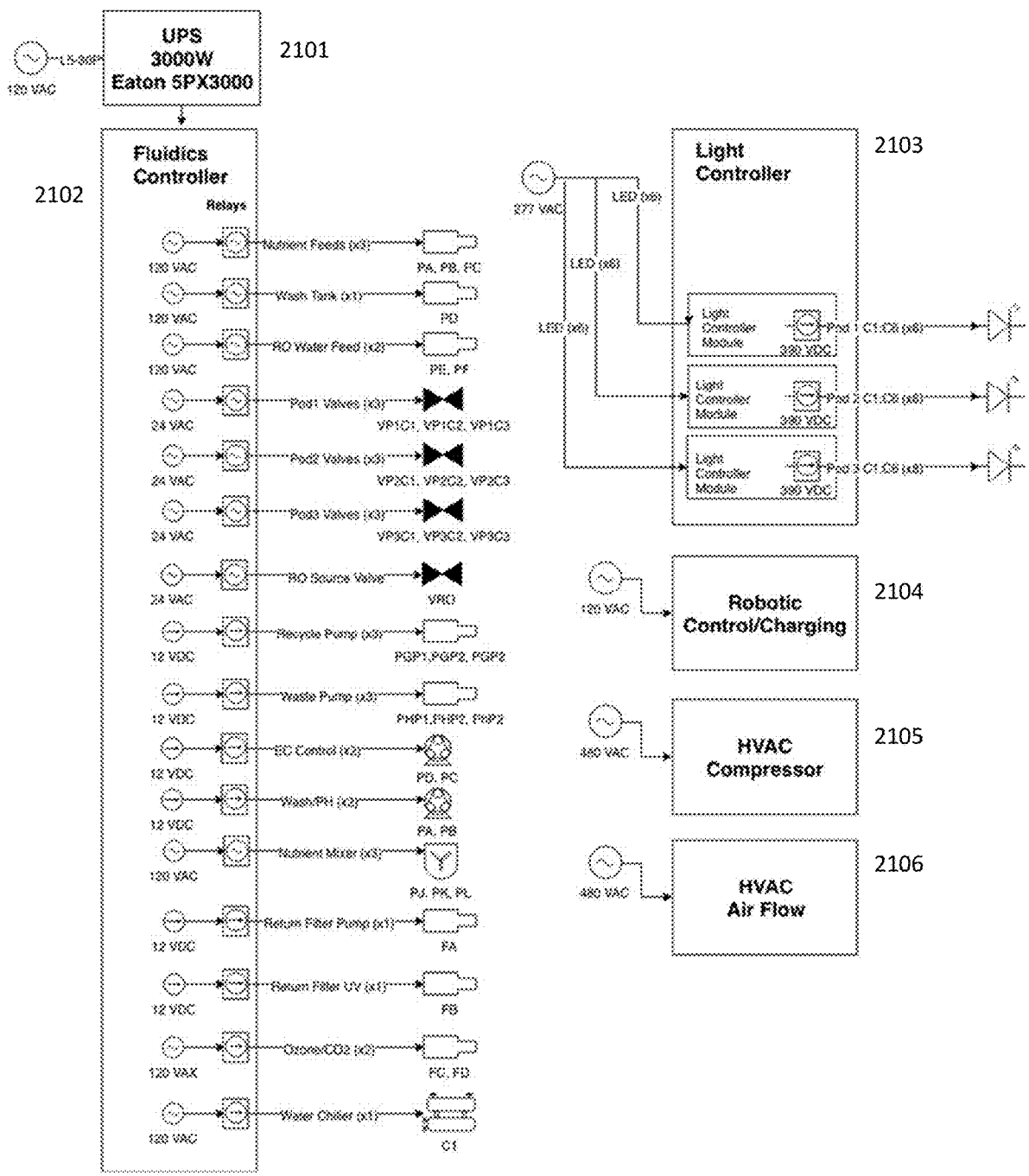
FIG. 21 shows an electrical configuration according to an embodiment of the disclosure.

FIG. 21 shows an electrical configuration of a power distribution system according to an embodiment of the disclosure. This may include a collection of components responsible for bringing power in from an external power source [e.g., the grid, renewable energy sources, non-renewable energy sources, etc.] and manipulating it before delivery to the various components and subsystems within the facility that may require power. This power distribution system may frequency modulate the power entering the lights, control intensity of illumination, and control the output spectrum of the LED lights. This power distribution system may also accommodate energy coming directly from solar power without battery storage.

For the fluidics system 2102, the 120-volt alternating current (AVC) line may enter an uninterruptable power supply (UPS) 2101. This UPS 2101 may serve as a battery backup and power regulator for the fluidics system 2102. The UPS 2101 may send power to a variety of voltage converters that step the voltage down to the required level to operate the subcomponents. If additional pods are introduced into the system, extra components may be added to accommodate.

For the light controller 2103, a 277 VAC line may be brought in to supply enough energy to however many pods are present. In this example, 3 pods are present, therefore the power is sent to three different light controller modules. Other subsystems within the facility [HVAC compressor 2105, HVAC circulation 2106, frog charge/transmit 2104, control center, preprocessing and postprocessing, etc.] also may receive power to operate.

Figure 22:
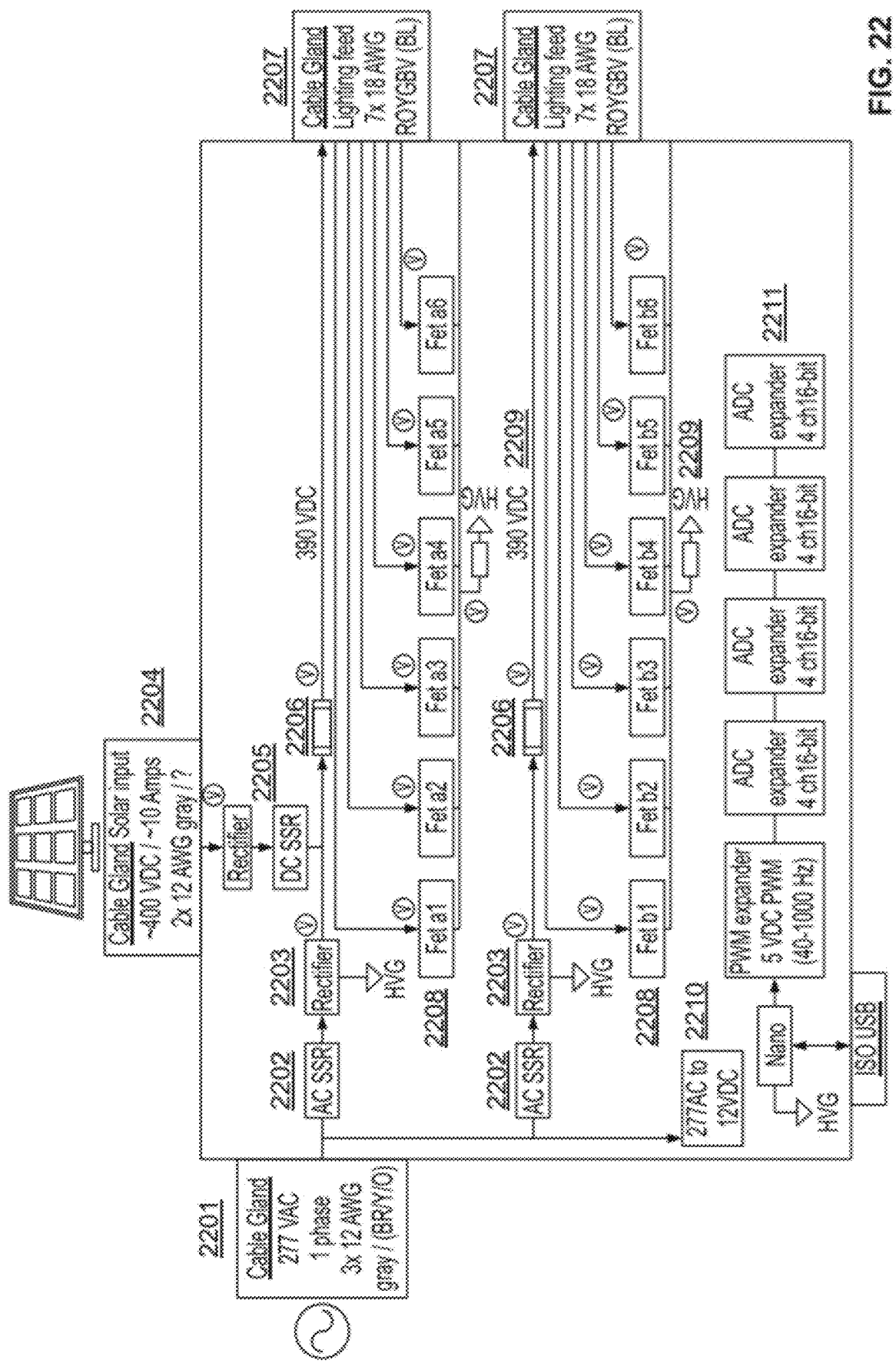
FIG. 22 shows a light controller according to an embodiment of the disclosure.

FIG. 22 shows a light controller 2200 according to an embodiment of the disclosure. The example light controller 2200 may include the hardware and circuit setup for a set of two pods, but any number of pods may be present. For power from the grid 2201, an alternating current solid-state relay (AC SSR) 2202 may sit between the grid 2201 and the rectifier 2203. In the case of a renewable energy source 2204, a direct current solid state relay (DC SSR) 2205 may feed directly into the "high line" with a fuse 2206 downstream to protect the light circuit. The power may be routed through each respective light column 2207—six in this case—then brought through high-power MOSFETs 2208 before entering high voltage ground (HVG) 2209. The 277 VAC may be converted 2210 to 12 volts direct current (VDC) to supply various electrical components 2211 that may pulse-width modulate (PWM) the signal going to the light columns 2207.

This arrangement of electronic hardware may allow for minimal electrical components between the lights and the grid whilst also improving the power factor, drastically decreasing the cost of power delivery to the LED strips, and providing decreased maintenance cost since LED drivers may fail regularly. This implementation may centralize the power delivery hardware outside of the growth arena, which may decrease heat production within the growth arena and/or improve the serviceability of the system through easier access to the hardware.

Figure 23:
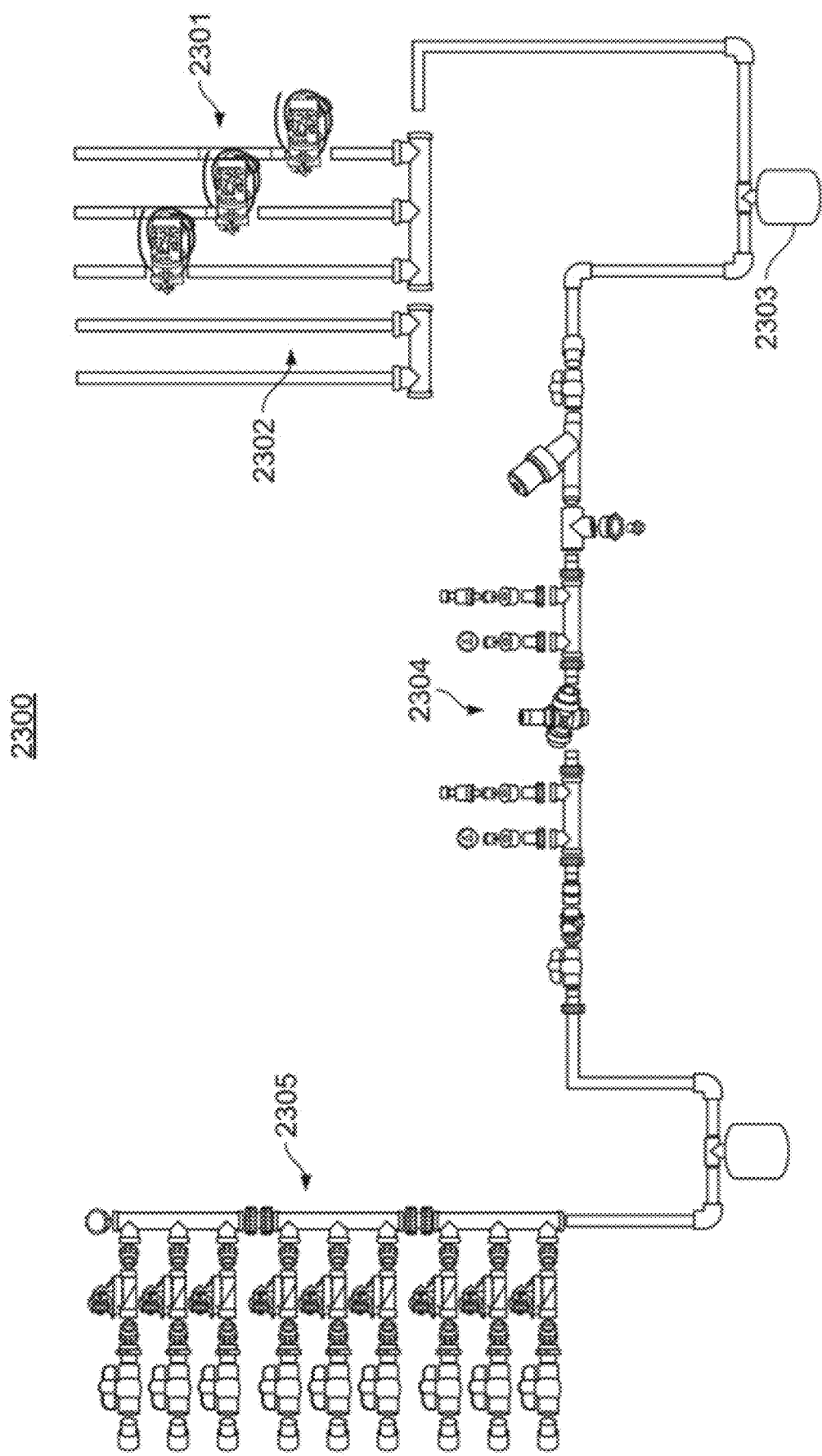
FIG. 23 shows a pre-pod fluidics system according to an embodiment of the disclosure.

FIG. 23 shows a pre-pod fluidics system 2300 according to an embodiment of the disclosure. The fluid in the pre-pod fluidics system 2300 may flow from right-to-left in this illustration. An array of pumps 2301 may draw nutrient mixture in from one or many nutrient tanks that may be generally premixed. The premixing may be performed by a closed loop system of nutrient-characteristic sensors and peristaltic pumps to control the nutrient characteristics inside the tanks. In addition to the nutrient lines, a cleanwater line (e.g., by reverse osmosis) and/or wash line 2302 may connect in parallel to the feed line. These lines may be used for flushing and cleaning of all the components downstream, including the cavities and the drain line.

An accumulation tank 2303 may be used to mitigate the water hammer caused by cycling pumps which may damage sensor components. Moreover, the accumulation tank 2303 may help with maintenance of a constant pressure in the system. A variety of valves, filters, risers, gages, sensors, regulators, and couples 2304 may be used to maintain a desirable state in the pre-pod fluidics system. As the fluids are about to introduced to the pods, a set of manual valves and electronically controlled valves 2305 may regulate the flow timing of nutrient delivery to the plants.

Figure 24:
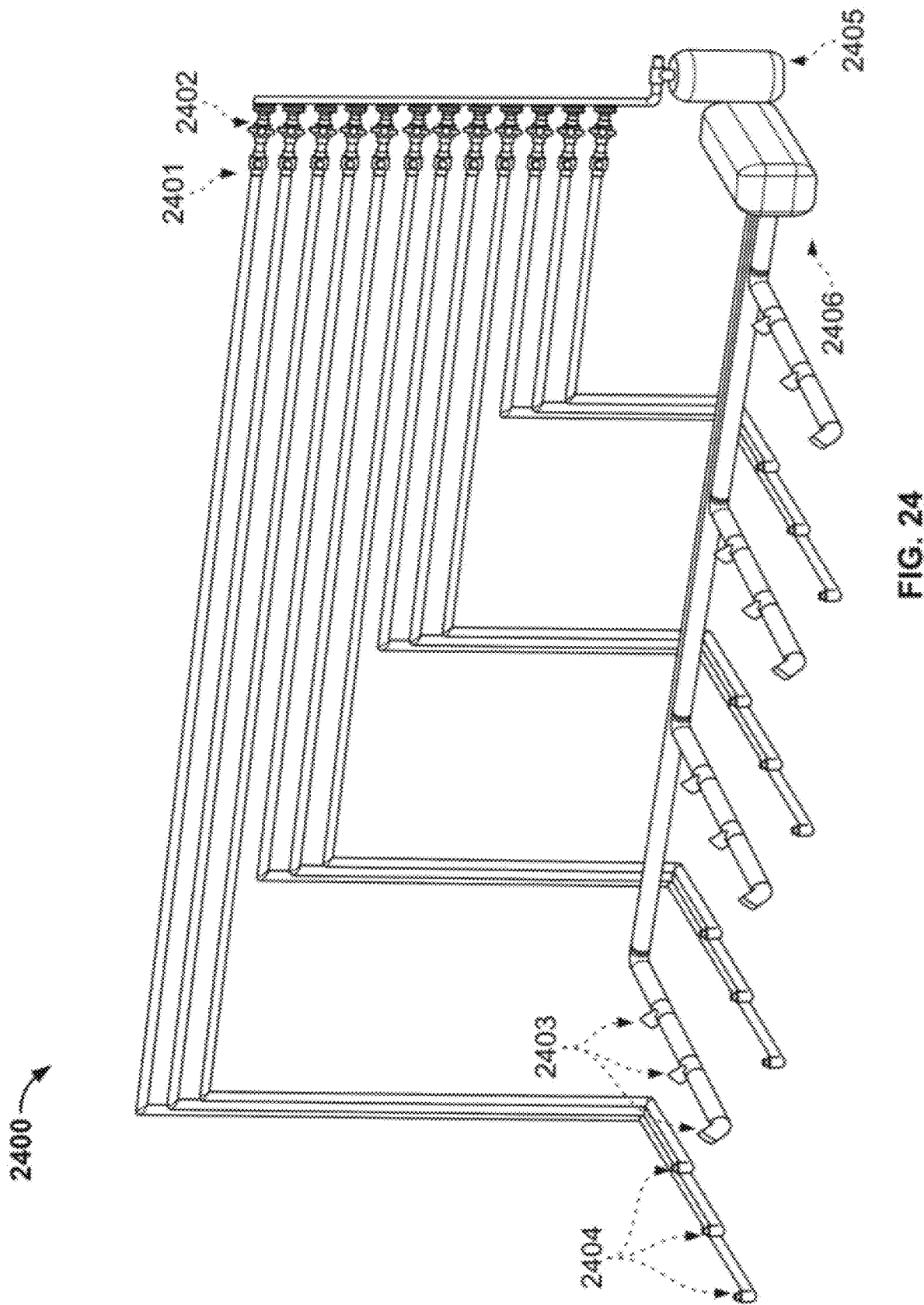
FIG. 24 shows a pod fluidics system according to an embodiment of the disclosure.

FIG. 24 shows a pod fluidics system 2400 according to an embodiment of the disclosure. This system may be disposed within the column's cavity (e.g., 309 and 312). Here, fluid introduced from the bottom of the column's cavity may travel up a central conduit to the top of the column. It then may split into two channels that break off into any number of vertically hanging fluid-delivery lines. Connected to these may be vertically hanging nozzles. These nozzles may atomize the fluid and/or may spray it into the column's cavity. Generally, a higher density of nozzles may be situated at the top of the column's cavity as compared to the bottom of the column. The goal of these fluidics lines may be to cover the entire surface-area of every root within the column's cavity.

From the accumulation tank 2405, the fluid may enter the distribution lines and may come into contact with the electronically controlled solenoid valves 2402 first, then the manually controlled valve 2401. The fluid may then enter the feed line to the column. In this image, four pods have had their fluidics system routed. The column's fluidics introduction point 2404 may feed the pressurized nutrient [or other] fluid to the column to distribute to the plants through the nozzles.

After the optimal amount of fluid has been deposited inside the column, the remaining liquid may drain back down to the drainage tray and may be removed by drain bulkhead connection 2405 to be accumulated back into the drain tank 2406. This fluid may be tested and recycled back into the nutrient tanks to flow back into the system.

The fluidics system may be built to auto-clean. Upstream of the nozzles there may be a cleaning solution being stored in a container. Scheduled by the central control system, at various points in time, the cleaning solution may be introduced to the system and flowed through the pumps, manifolds, valves, junctions, connectors, pipes, and nozzles to remove unwanted biological material among other things. This cleaning solution may be used not only to clean the nozzles in the column's cavity, it may also be used to clean the column's cavity itself. The solution may be sprayed into the column's cavity to neutralize unwanted biological growth. This spoiled cleaning solution may be sent through the drainage system to be disposed in accordance with the presiding regulations.

Figure 25:
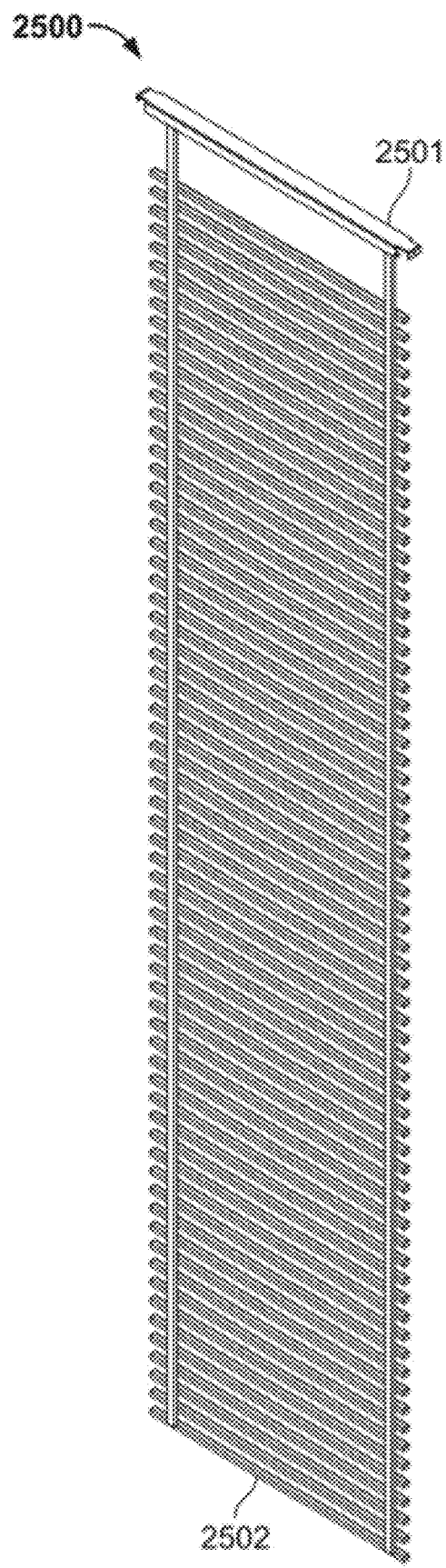
FIG. 25 shows a light column according to an embodiment of the disclosure.

FIG. 25 shows a light column 2500 according to an embodiment of the disclosure. The illumination system may be primarily responsible for the delivery of photons of the correct wavelength, intensity and density to the biological matter within the facility. The light column 2500 may be a subsystem of the illumination system that may interact with the growth structure, power distribution system, HVAC system, and/or frog to maintain optimal illumination of the biological entities.

The light column may be suspended from a pallet support beam 2501 at the top of the light column that may be seated on the load beams spanning between uprights. The light column may be connected electrically to the pod light controller at either the top or the bottom of the light column. The connection may be wired, contact, or blind-mate connections, for example.

In this instance, two straps hang down from the frame at the top. These straps may be folded and holed such that the wires can travel down the interior of the crease and the lights can be mounted at different points along the straps. For this example, LED strips 2502 may be used to illuminate the biological entities. The LED strips may be mounted to the straps and may receive power from the wires confined in the fold of the straps. In other iterations of the light column, the LED strips may be oriented vertically or diagonally with the straps being on the ends, central, or any variation in between. Another potential implementation of the light column may take notions from the cavity channel interaction with the growth module/comb; two channels per light column may hang from the load beams on the growth structure. Light strips/modules may then be dropped down into the channel and may receive power upon contact of either the terminals of the lighting module below, or from the terminals housed within the channel.

The light column may be constructed in such a way that it may be moved closer or further away from the growth modules/comb it is illuminating or removed from the growth arena altogether. When repositioning the light column, the frog may lift the pallet support beam up from the load beam and reposition it to maintain optimal illumination of the biological entity in terms of plant characteristics and operational efficiency.

The frog may be responsible for the removal of the light column altogether. If there is a wired connection, the connector may be disengaged manually or through a frog subsystem. Once the connection to the power distribution system is unmated, the frog may roll-up, fold, or stack the lights within its inner frame in order to move the light column to another location within or outside of the growth arena.

Figure 26:
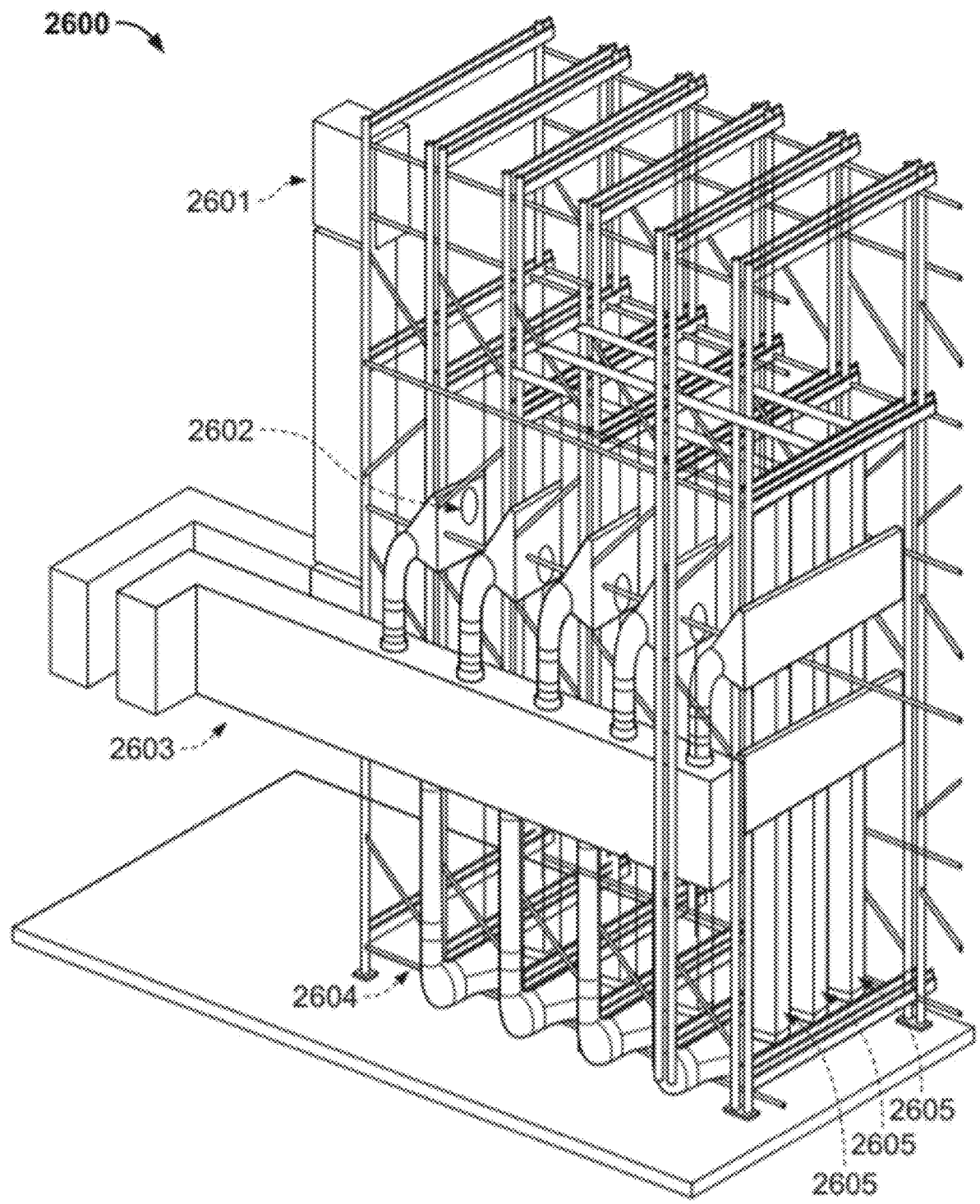
FIG. 26 shows an HVAC system with a growth structure according to an embodiment of the disclosure.

FIG. 26 shows an HVAC system 2600 with a growth structure according to an embodiment of the disclosure. HVAC system 2600 may control the atmospheric elements of the environmental characteristics within the facility. On the back-end a collection of hardware and software may treat the air so that it enters the inlet duct 2603 at the desired temperature, humidity, CO2 concentration, O2 concentration, and volumetric flow rate, among other parameters. This inlet duct may split into ducts oriented upward and downward at each pod such that the new air can be delivered either side of each column. A variety of components that may include HVAC junctions, fittings, elbows, reducers, couplers, and/or splitters may be used to redirect the flow of air into the desired locations within the growth arena. After the main inlet duct has been split to each of the growth pods, an elbow 2604 may redirect the flow from outside the growth arena to inside the growth arena. At this point the air may enter into a rectangular profile that may be is optimized for ducting through the growth structure and may flow through this rectangular-profiled duct to the point of delivery. Along this rectangular-profiled duct there may be a variety of diffusers 2602, emitters, nozzles, and orifices that may deliver the treated air to the cavities 2605. Once the air has been delivered to the growth arena, the air may heat up and rise to the top of the growth arena, at which point the outlet duct 2601 may remove the air.

FIG. 27 shows an HVAC system 2600 with no growth structure according to an embodiment of the disclosure. The air may be delivered to the shared atmospheric zones between the columns in the growth pods and/or to the atmospheric zones at either end of the growth pods. Air may be delivered to the bottom of the column and, using the effects of natural convection and the entrance velocity of the air, it may travel upward, generating a flow of air from the bottom of the column to the top of the column. A varying number of rectangular-profiled ducts may be introduced at various heights along the column to make sure that the environmental characteristics across the column are as uniform as possible while maintaining the flow of air from low to high. To help with this, diffusers 2703 may be installed in various places downstream of the inlet duct 2702.

Additional factors to consider may include the impact of the lights on the atmospheric environment. The lights within the atmospheric zone between the column may heat up the air. As is well known, hot air rises, which may assist in the movement of air from the bottom of the column to the top of the column. Vertical-plane production may enable natural convection which produces the effect of airflow beneath the canopy of the crop. In horizontal-plane production, stagnant air may accumulate beneath the canopy, which may increase dead-zones, moisture build-up, and, inevitably, undesirable biological growth.

Once the newly-introduced air has performed its duty within the atmospheric zone, it may rise naturally above the growth structure where the frog is operating. Part of the benefit of a top-mounted automation mechanism is this unoccupied volume above the growth structure. Here, unwanted heat and used air may accumulate and not adversely affect the biological entities in the columns. An outlet duct 2701, which may aid in the flow of air from low to high, situated at the edge of the growth arena may pull air directly out of the frog's operating volume above the growth structure.

This HVAC ecosystem may have many variations in implementation but may be built to implement the following overriding assumptions: maintain a flow of air from the bottom of the column (growth structure) to the top of the column (growth structure); maintain environmental characteristics that are favorable to the biological entity growing within the growth arena that each HVAC system is delivering and removing to/from; and interact with the facility software control system to optimize performance in conjunction with other subsystems within the facility (fluidics, lighting, frog, etc.).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An automatic vertical farming system comprising:
a frame surrounding at least one shoot zone and at least one root zone and supporting a plurality of vertical plant growth structures within an area surrounded by the frame such that each of the vertical plant growth structures is arranged in a plane oriented vertically with respect to the frame, the plane defining, for each of the vertical plant growth structures, a growth surface area from which plant stems emerge on one side, facing the at least one shoot zone, and a root surface area from which plant roots emerge on an opposite side, facing the at least one root zone, wherein:
the at least one shoot zone is shared by two respective growth surface areas of adjacent vertical plant growth structures horizontally opposed to one another and arranged so that respective plant stems emerge horizontally facing one another from the two respective growth surface areas, and the at least one root zone is shared by two respective root surface areas of each vertical plant growth structure horizontally opposed to one another and arranged so that respective plant roots emerge horizontally facing one another from the two respective growth surface areas;

at least one light coupled to the frame and configured to illuminate the at least one growth area;

at least one liquid conduit coupled to the frame and configured to supply liquid to and from the at least one growth area;

at least one gas conduit coupled to the frame and configured to supply gas to and from the at least one growth area;

at least one robot disposed on a top side of the frame and movably supported by the frame, wherein the top side of the frame is above the at least one growth area and the robot is movably supported so that it is movable to traverse the at least one growth area above the at least one growth area, the at least one robot comprising at least one tool configured to manipulate the plurality of vertical plant growth structures;

and a control system including at least one processor configured to automatically control illumination by the at least one light, liquid flow through the at least one liquid conduit, gas flow through the at least one gas conduit, and operation of the at least one robot.

2. The system of claim 1, wherein the at least one vertical plant growth structure includes a growth module or vertical comb frame defining a plurality of spaces each configured to accept a single puck module.

3. The system of claim 2, further comprising at least one puck module disposed in at least one of the plurality of spaces.

4. The system of claim 3, wherein the at least one puck module includes at least one of a growth puck module including a plant growth medium disposed therein, a sensor puck module including at least one sensor disposed therein, and a spacer puck module.

5. The system of claim 4, further comprising at least one plant disposed in the plant growth medium.

6. The system of claim 4, wherein the control system is configured to receive sensor data from the at least one sensor and control at least one of the illumination, liquid flow, gas flow, and robot operation based on the sensor data.

7. The system of claim 3, wherein the at least one tool includes a tool configured to move the at least one comb or at least one puck module into the at least one of the plurality of spaces, out of the at least one of the plurality of spaces, or from one of the at least one of the plurality of spaces to another of the at least one of the plurality of spaces.

8. The system of claim 1, wherein the at least one tool includes at least one sensor, wherein the control system is configured to receive sensor data from the at least one sensor and control at least one of the illumination, liquid flow, gas flow, and robot operation based on the sensor data.

9. The system of claim 1, wherein the at least one tool includes a claw configured to grip, raise, and lower at least one of the plurality of vertical plant growth structures.

10. The system of claim 1, wherein the at least one tool includes at least one of a cleaning tool, a seeding tool, a sensor tool, a facility-construction tool, a light movement tool, a fluidics movement tool, a trimming tool, a manicuring tool, a pollination tool and a harvesting tool.

11. The system of claim 1, wherein the at least one robot includes a plurality of wheels in contact with the frame and a motor coupled to at least one of the wheels configured to move the at least one robot in response to instructions from the control system.

12. The system of claim 1, wherein the at least one processor includes at least one of a processor disposed on each robot, a processor located in a same facility as the frame, and a cloud-based processor.

13. The system of claim 1, wherein the control system includes a memory including at least one recipe defining how at least one plant is to be processed by the system.

14. The system of claim 13, wherein the at least one processor is configured to control at least one of the illumination, liquid flow, gas flow, and robot operation based on the at least one recipe.

15. The system of claim 13, further comprising at least one sensor, wherein the at least one processor is configured to modify the control of at least one of the illumination, liquid flow, gas flow, and robot operation based on data from the at least one sensor.

16. An automatic farm control method comprising:

automatically controlling, by a control system including at least one processor, illumination by at least one light, the at least one light being coupled to a frame surrounding at least one shoot zone and at least one root zone and supporting a plurality of vertical plant growth structures within an area surrounded by the frame such that each of the vertical plant growth structures is arranged in a plane oriented vertically with respect to the frame, the plane defining, for each of the vertical plant growth structures, a growth surface area from which plant stems emerge on one side, facing the at least one shoot zone, and a root surface area from which plant roots emerge on an opposite side, facing the at least one root zone, wherein:

the at least one shoot zone is shared by two respective growth surface areas of adjacent vertical plant growth structures horizontally opposed to one another and arranged so that respective plant stems emerge horizontally facing one another from the two respective growth surface areas, and the at least one root zone is shared by two respective root surface areas of each vertical plant growth structure horizontally opposed to one another and arranged so that respective plant roots emerge horizontally facing one another from the two respective growth surface areas, and the at least one light is configured to illuminate the at least one growth area;

automatically controlling, by the control system, liquid flow through at least one liquid conduit coupled to the frame and configured to supply liquid to and from the at least one growth area;

automatically controlling, by the control system, gas flow through at least one gas conduit coupled to the frame and configured to supply gas to and from the at least one growth area;

and automatically controlling, by the control system, operation of at least one robot disposed on a top side of the frame and movably supported by the frame, or another frame, wherein the top side of the frame is above the at least one growth area and the robot is movably supported so that it is movable to traverse the at least one growth area above the at least one growth area, the at least one robot comprising at least one tool configured to manipulate the plurality of vertical plant growth structures.

17. The method of claim 16, wherein at least one of the vertical plant growth structures includes a vertical comb frame defining a plurality of spaces each configured to accept a single puck module, and at least one puck module is a sensor puck module including at least one sensor disposed therein, the method further comprising:
receiving, by the control system, sensor data from the at least one sensor; and
controlling, by the control system, at least one of the illumination, liquid flow, gas flow, and robot operation based on the sensor data.

18. The method of claim 17, wherein controlling the operation of the at least one robot includes controlling the at least one tool to move at least one puck module into the at least one of the plurality of spaces, out of the at least one of the plurality of spaces, or from one of the at least one of the plurality of spaces to another of the at least one of the plurality of spaces.

19. The method of claim 16, wherein the at least one tool includes at least one sensor, the method further comprising:
receiving, by the control system, sensor data from the at least one sensor; and
controlling, by the control system, at least one of the illumination, liquid flow, gas flow, and robot operation based on the sensor data.

20. The method of claim 16, wherein the at least one robot includes a plurality of wheels in contact with the frame and a motor coupled to at least one of the wheels configured to move the at least one robot, the method further comprising controlling, by the control system, the at least one motor.

21. The method of claim 16, wherein the control system includes a memory including at least one recipe defining how at least one plant is to be processed by the system, the method further comprising controlling, by the control system, at least one of the illumination, liquid flow, gas flow, and robot operation based on the at least one recipe.

22. The method of claim 21, further comprising modifying, by the control system, the control of at least one of the illumination, liquid flow, gas flow, and robot operation based on data from at least one sensor.

23. The system of claim 1, wherein the at least one robot is configured to operate the at least one tool to access an entire vertical length of the at least one shoot zone, an entire vertical length of the at least one root zone, or a combination thereof.

24. The method of claim 16, further comprising automatically controlling, by the control system, operation of the at least one robot to operate the at least one tool to access an entire vertical length of the at least one shoot zone, an entire vertical length of the at least one root zone, or a combination thereof.

25. The system of claim 1, wherein the two respective growth surface areas are arranged in parallel to horizontally face one another, and the two respective root surface areas are arranged in parallel to horizontally face one another.

26. The method of claim 16, wherein the two respective growth surface areas are arranged in parallel to horizontally face one another, and the two respective root surface areas are arranged in parallel to horizontally face one another.

* * * * *